US012613828B2

(12) United States Patent
Dondini et al.

(10) Patent No.: US 12,613,828 B2
(45) Date of Patent: Apr. 28, 2026

(54) PROCESSING SYSTEM, RELATED INTEGRATED CIRCUIT, DEVICE AND METHOD

(71) Applicants: STMicroelectronics S.r.l., Agrate Brianza (IT); STMicroelectronics Application GMBH, Aschheim-Dornach (DE)

(72) Inventors: Mirko Dondini, Catania (IT); Calogero Andrea Trecarichi, Gela (IT); Fred Rennig, Nandlstadt (DE)

(73) Assignees: STMicroelectronics Application GMBH, Aschheim-Dornach (DE); STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 18/503,744

(22) Filed: Nov. 7, 2023

(65) Prior Publication Data

US 2024/0160598 A1      May 16, 2024

(30) Foreign Application Priority Data

Nov. 16, 2022     (IT) ........................ 102022000023610

(51) Int. Cl.
G06F 13/42          (2006.01)
(52) U.S. Cl.
CPC ...... G06F 13/4282 (2013.01); G06F 2213/40 (2013.01)
(58) Field of Classification Search
CPC ................................................ G06K 19/07762
See application file for complete search history.

(56) References Cited

U.S. PATENT DOCUMENTS 7,490,211 B2 * 2/2009 Schnepper .......... G06F 13/1694
                                                             711/170
10,678,726 B2 6/2020 Rennig et al.

FOREIGN PATENT DOCUMENTS

EP          1085722 A2     3/2001
WO          9506378 A1     3/1995

OTHER PUBLICATIONS

International Standard, "Road vehicles—Controller area network (CAN)—Part 1: Data link layer and physical signaling," ISO 11898-1, Second Edition, Dec. 15, 2015, ISO 11898-1:2015(E), 74 pages.

(Continued)

*Primary Examiner* — Henry Tsai
*Assistant Examiner* — Juanito C Borromeo
(74) *Attorney, Agent, or Firm* — Slater Matsil, LLP

(57)          ABSTRACT

An example processing system includes a processing circuit, a volatile memory and a CAN communication controller circuit. The CAN communication controller circuit includes configuration and status registers. A transmission handler circuit and a reception handler circuit transmits and receives data via the CAN core circuit by exchanging data with the volatile memory based on the configuration data stored to the configuration and status registers, and filter elements stored to the volatile memory. Specifically, the processing system further includes a hardware host circuit comprising a non-volatile memory configured to store first configuration data (CD1) and second configuration data (CD2). The CD1 includes configuration data to be transferred to the configuration and status registers of the CAN communication controller circuit and the CD2 includes at least one filter element to be transferred to the volatile memory. A control circuit manages an initialization mode, a reception mode and a transmission mode. During the initialization mode, the (Continued)

hardware host circuit stores the CD1 to the configuration and status registers and the CD2 to the volatile memory.

23 Claims, 15 Drawing Sheets

(56) References Cited

OTHER PUBLICATIONS

International Standard, "Road vehicles—Controller area network (CAN)—Part 2: High-speed medium access unit," ISO 11898-2, Second Edition, Dec. 15, 2016, ISO 11898-2:2016(E), 38 pages.
CiA, "CAN Node and system design, Part 1: Physical interface implementation", version 2.0.0, 601 Draft Standard, Feb. 1, 2017, 18 pages.
Robert Bosch GMBH, "M_CAN Controller Area Network User.s Manual", Revision 3.3.0 of Oct. 30, 2018, 95 pages.
Stmicroelectronics, "CAN FD Light Network Protocol and Implementation", EMEA APG Marketing & Application, EuES003-6, version 1.3, Sep. 17, 2019, 22 pages.
Stmicroelectronics, "RM0407 Reference manual, SPC58 C Line—32 bit Power Architecture automotive MCU Dual z4 cores 180 MHz, 4 MBytes Flash, HSM, ASIL-B," Apr. 2021, Revision 7, 2856 pages.

* cited by examiner

SIDFC.FLSSA — 602

XIDFC.FLESA — 604

RXF0C.F0SA — 606

RXF1C.F1SA — 608

RXBC.RBSA — 610

TXEFC.EFSA — 612

TXBC.TFSA — 614

32 bit

62a

64

50

60

FIG. 8 m_can_tx
m_can_rx

PROCESSING SYSTEM, RELATED INTEGRATED CIRCUIT, DEVICE AND METHOD

CROSS-REFERENCE TO RELATED APPLICATIONS

This application claims the priority benefit of Italian patent application number 102022000023610, filed on 16 Nov. 2022, entitled "Processing system, related integrated circuit, device and method" which is hereby incorporated by reference to the maximum extent allowable by law.

TECHNICAL FIELD

Embodiments of the present disclosure relate to solutions for implementing a CAN/CAN-FD communication system.

BACKGROUND

Various applications, e.g., in the automotive field, involve exchange of data on one or more bus networks. High data rate, robustness, fault detection, safety and low cost are often desirable features for such applications.

For example, FIG. 1 shows a typical electronic system, such as the electronic system of a vehicle, as disclosed, e.g., in United States Patent Publication n. U.S. Pat. No. 10,678,726 B2, which is incorporated herein by reference Specifically, in the example considered, a first device 10 and a set of second devices 20, such as devices 201, 202, . . . , 20n, e.g., on board of a vehicle V, are connected via a bus 30. For example, the bus 30 may be a standard or extended Controller Area Network (CAN) bus, a CAN Flexible Data-Rate (FD) bus, a CAN FD Light bus or a CAN XL bus. For example, concerning the CAN FD protocol, reference can be made to documents "Road vehicles—Controller area network (CAN)—Part 1: Data link layer and physical signaling", ISO 11898-1:2015 2015, "Road vehicles—Controller area network (CAN)—Part 2: High-speed medium access unit", ISO 11898-2:2016 2016, and/or "RM0407 Reference manual—SPC584Cx/SPC58ECx 32-bit MCU family built on the PowerArchitecture for automotive body electronics applications", RM0407 Rev. 5, May/2019. Conversely, the CAN FD Light protocol is described, e.g., in documents "CAN FD Light Specification and test plan", CAN in Automation (CiA) 604-1, version 0.0.6, or "CAN FD Light Network Protocol and Implementation", EuES003-6, version1.3, which are incorporated herein by reference.

For example, in a typical application, the device 10 is a CAN commander configured to transmit over the bus 30 a CAN frame to the devices 20. For example, independently from the specific CAN protocol used, such a CAN frame comprises—amongst other data—the following fields: an identifier, i.e., a standard CAN identifier having ii bits or an extended CAN identifier having 29 bits, indicating the target device or devices of the communication; a 4-bit Data Length Code field used to specify the amount of data transmitted (typically the values from 0x0000 to 0x1000 correspond to 0-8 data bytes, and values 0x1001 to 0x1111 correspond to 12, 16, 20, 24, 32, 48 and 64 data bytes, respectively); and the payload, which may correspond to 0-8, 12, 16, 20, 24, 32, 48 and 64 data bytes.

Accordingly, each device 20 may have associated one or more identifiers, and may determine whether the transmitted CAN frame comprises an identifier corresponding to one of the identifiers associated with the device 20. In this case, the device may process the CAN frame and extract the payload. For example, by assigning to a device 20 a univocal identifier, the CAN frame may be used to transmit a point-to-point communication addressed univocally to the device. Conversely, by assigning to a device 20 an identifier being also assigned to one or more further devices 20, the CAN frame may be used to transmit a multi-cast communication being addressed to a subset of the devices 20. For example, by assigning a given identifier to all devices 20, the CAN frame may be used to transmit a broadcast communication to all devices 20.

For example, as exemplified in FIG. 1, the devices 20 may be used to control one or more actuators. In this case, the payload of the CAN frame may thus comprise one or more actuation command. For example, as schematically shown in FIG. 1, the devices 20 may be used to drive one or more front, rear and/or interior lights of the vehicle V, e.g., implemented via one or more LED clusters or arrays. Accordingly, the device 10 may be, e.g., an electronic control unit (ECU) for, e.g., LED clusters in rear lights of the vehicle V.

For example, in case of a vehicle V, both the device 10 and the devices 201, 202, . . . , 20n may be supplied with power from a power source 40, e.g., a battery provided within the vehicle. For example, the device 10 usually comprises a microcontroller 106, wherein the microcontroller 106 and the device 20 are supplied by one or more electronic converters 101 and 102. Typically, the microcontroller 106 has also associated further circuits 103 and 104, which may include a low-dropout (LDO) linear voltage regulator, a stand-by and reset circuit, an oscillator, etc.

Generally, the device 10 may also comprise one or more further communication interface 105, such as a LIN2.2/HS-CAN transceiver, configured to be connected to a one or more further communication buses 107 for communication with other ECUs possibly included in the vehicle V.

Such an architecture for the device 10 is conventional in the art, thus making it unnecessary to provide a more detailed description herein.

For example, FIG. 2A is a block diagram exemplary of a possible implementation of the device 10.

Specifically, in the example considered, the device 10 comprises a CAN transceiver 108, such as a CAN FD transceiver, for exchanging data via the CAN bus 30, and optional one or more further transceiver circuit 105 for exchanging data with the one or more further communication channels 107. For example, in FIG. 2A, these transceivers are external with respect to the integrated circuit of the microcontroller 106.

Moreover, the microcontroller 106 comprises a CAN protocol controller 1062 (implemented in hardware and/or software), such as a CAN FD protocol controller, and a software application 1061 (e.g., implemented in SW) configured to control the operation of the device 10 by communicating with the CAN protocol controller 1062, e.g., in order to transmit commands to the devices 20 in order to control the operation of the devices 20 and/or for requesting status information from the devices 20. Generally, the microcontroller may also comprise further analog and/or digital resources/peripherals 1063.

Accordingly, a hardware CAN protocol controller circuit 1062 usually handles the data link layer and the physical layer, while a software application 1061 executed by a microprocessor of the microcontroller handles the application layer. For example, in this way, the CAN protocol controller may handle the generation, transmission and reception of CAN frames, without the intervention of software instruction executed by the microprocessor of the microcontroller 106.

Such microcontrollers 106 with integrated CAN protocol controllers are well-known in the art. For example, reference can be made to the SPC58 C Line microcontrollers commercialized by STMicroelectronics. For example, this microcontroller comprises a plurality of Modular CAN cores, which may be configured according to the specific application needs. The Modular CAN core, also identified as M_CAN, is an IP core provided by Bosch, which supports Classical CAN and CAN FD. For example, this M_CAN IP is described in VHDL on RTL level, and may be used to generate via synthesis a CAN Communication Controller circuit, indicated in the following as M_CAN IP circuit, or in the context of circuits just as M_CAN IP. For example, the interface of the Modular CAN core is described in document "M_CAN Controller Area Network User's Manual", Robert Bosch GmbH, e.g., Revision 3.3.0 of October 2018, or at section 47.3 of the reference manual RM0407, "SPC58 C Line—32 bit Power Architecture automotive MCU", STMicroelectronics, e.g., revision 7 of April 2021, which are incorporated herein by reference for this purpose.

Conversely, FIG. 2B is a block diagram exemplary of a possible implementation of a device 20.

Specifically, in the example considered, the device 20 comprise a CAN communication and protocol controller circuit 201, such as CAN FD Light communication and protocol controller, connected to a CAN transceiver 203, such as a CAN FD transceiver, for exchanging data via the CAN bus 30. Typically, the device 20 comprises also a memory 202 for storing the data to be transmitted or the received data. Finally, the device 20 comprises a digital processing circuit 204 configured to exchange data with: the CAN protocol controller circuit 201, e.g., in order to receive a status/interrupt signal indicating that a new CAN frame addressed to the device 20 has been received and/or request the transmission of data stored to the memory 202, and the memory 202, in order to read the receive data from the memory 202, process the received data, and optionally store response data to the memory 202, which are then transmitted via the CAN protocol controller circuit 201.

Typically, the CAN communication and protocol controller circuit 201, and possibly the complete device 20, is implemented with an application-specific hardware, such as Application-Specific Integrated Circuit (ASIC), in order to reduce the necessity of embedded processors for running software on the device 20.

Accordingly, while modular CAN IPs, such as the Bosch M_CAN IP, have to be certified only once and may then be re-used in various types of micro-controllers 106, which may also use different configurations for the CAN protocol controller 1062, the CAN communication and protocol controller circuits 201 of the devices 20 are usually developed for specific applications. For example, such integrated CAN communication and protocol controller circuits 201 have usually only a reduced complexity. For example, such CAN communication and protocol controller circuits 201 typically support only the CAN FD Light protocol, wherein the CAN communication and protocol controller circuit 201 does not manage the arbitration phase of the CAN protocol, but simply transmits a pre-generated CAN FD Light frame in response to a given request received from a device 10. In this respect, it would however be advantageously to also equip CPU-less electronic devices 20 with standard communication interfaces, exploiting state-of-the-art and certified protocol controllers available on the market, such as the Bosch M_CAN IP.

SUMMARY

In view of the above, various embodiments of the present disclosure describe using a M_CAN core without a microprocessor.

As mentioned before, various embodiments of the present disclosure relate to a processing system. Specifically, the processing system comprises a processing circuit, a volatile memory and a CAN communication controller circuit.

In various embodiments, the CAN communication controller circuit is based on the M_CAN IP. Specifically, in this case, the CAN communication controller circuit comprises a set of configuration and status registers and a slave communication interface operatively connected to the configuration and status registers and configured to receive read requests for reading the content of the configuration and status registers, and write requests for writing the content of the configuration and status registers. For example, the configuration and status registers may comprise:

a register "CC Control Register", CCCR, comprising a bit "Initialization", INIT, for starting and ending an initialization state of the CAN communication controller circuit and a bit "Configuration Change Enable", CCE, for enabling write access to a subset of the configuration and status registers, a register "Rx FIFO 0 Configuration", RXF0C, comprising a field "Rx FIFO 0 Start Address", F0SA, for configuring a start address of a memory area in the volatile memory adapted to store a first reception FIFO, a register "Rx FIFO 1 Configuration", RXF1C, comprising a field "Rx FIFO 1 Start Address", F1SA, for configuring a start address of a memory area in the volatile memory adapted to store a second reception FIFO, a register "Rx Buffer Configuration", RXBC, comprising a field "Rx Buffer Start Address", RBSA, for configuring a start address of a memory area in the volatile memory adapted to store at least one reception buffer element, a register "Tx Event FIFO Configuration", TXEFC, comprising a field "Event FIFO Start Address", EFSA, for configuring a start address of a memory area in the volatile memory adapted to store a transmission FIFO, a register "Tx Buffer Configuration", TXBC, comprising a field "Tx Buffer Start Address", TBSA, for configuring a start address of a memory area in the volatile memory adapted to store at least one transmission buffer element, a register "Standard ID Filter Configuration", SIDFC, comprising a field "Filter List Standard Start Address", FLSSA, for configuring a start address of a memory area in the volatile memory adapted to store at least one standard filter element, wherein each standard filter element comprises a field "Standard Filter Element Configuration", SFEC, used to specify whether a standard CAN message should be stored to the first reception FIFO, the second reception FIFO or a reception buffer element and, in case the field SFEC indicates that a standard CAN message should be stored to a reception buffer element, a field "Standard Filter ID 2", SFID2, is used to select a reception buffer element and a field "Standard Filter ID 1", SFID1, specifies a standard identifier for a standard CAN message to be stored to the selected reception buffer element, a register "Extended ID Filter Configuration", XIDFC, comprising a field "Filter List Extended Start Address", FLESA, for configuring a start address of a memory area in the volatile memory adapted to store at least one extended filter element, wherein each extended filter element comprises a field "Extended Filter Element Configuration", EFEC, used to specify whether an extended CAN message should be stored to the first reception FIFO, the second reception FIFO or a reception buffer element and, in case the field EFEC indicates that an extended CAN message should be stored to a reception buffer element, a field "Extended Filter ID 2", EFID2, is used to select a reception buffer element and a field "Extended Filter ID 1", EFID1, specifies an extended identifier for an extended CAN message to be stored to the selected reception buffer element, a register "Tx Buffer Add Request", TXBAR, comprising for each transmission buffer element a respective bit "Tx Buffer Add Request", AR, for requesting the transmission of a CAN message stored to the respective transmission buffer element, and a reception status register indicating that a CAN message has been received and a transmission status register indicating that a CAN message has been transmitted;

Moreover, the CAN communication controller circuit comprises a CAN core circuit, a transmission handler circuit and a reception handler circuit. Specifically, the CAN core circuit is configured to, when the bit INIT of the register CCCR indicates that the CAN communication controller circuit is not in the initialization state, transmit a CAN message via a transmission line and receive a CAN message via a reception line.

Specifically, for this purpose, the transmission handler circuit is configured to monitor the register TXBAR in order to determine whether a CAN message stored to a transmission buffer element in the volatile memory should be transmitted. In response to determining that a CAN message stored to a transmission buffer element should be transmitted, the transmission handler circuit determines the address of the respective transmission buffer element based on the field TBSA of the register TXBC, reads the CAN message stored to the respective transmission buffer element from the volatile memory and transmits the read CAN message via the CAN core circuit. Finally, once the CAN message has been transmitted, the transmission handler circuit asserts a flag in the transmission status register in order to indicate that the CAN message has been transmitted.

Conversely, the reception handler circuit is configured to read at least one standard filter element and/or extended filter from the volatile memory, wherein the respective memory areas are indicated by the field FLSSA of the register SIDFC and the field FLESA of the register XIDFC. Accordingly, once the reception handler circuit receives via the CAN core circuit a CAN message, the reception handler circuit may determine whether a standard or extended filter element applies to the received CAN message. Specifically, in case a standard or extended filter element applies to the received CAN message, the reception handler circuit determines whether the received CAN message should be stored to the first reception FIFO, the second reception FIFO or a given reception buffer element as indicated by the respective standard or extended filter element For example, in response determining that the CAN message should be stored to a reception buffer element, the reception handler circuit determines the address of the given reception buffer element based on the field RBSA of the register RXBC, and stores the received CAN message to the given reception buffer element in the volatile memory. Finally, once the received CAN message has been stored to the given reception buffer element, the reception handler circuit asserts a flag in the reception status register in order to indicate that a CAN message has been received and stored to the given reception buffer element.

In various embodiments, the processing system further comprises a hardware host circuit. Specifically, the hardware host circuit comprises a memory interface circuit, a non-volatile memory, a master communication interface and a control circuit. Specifically, the memory interface circuit is configured to write data to and read data from the volatile memory, and the master communication interface is connected to the slave communication interface of the CAN communication controller circuit, i.e., the hardware host circuit may access the status and configuration registers of the CAN communication controller circuit and the volatile memory.

In various embodiments, the non-volatile memory is configured to store first configuration data and second configuration data, wherein the first configuration data comprise configuration data to be transferred to the configuration and status registers of the CAN communication controller circuit and the second configuration data comprise at least one standard and/or extended filter element to be transferred to the volatile memory.

In this respect, the control circuit comprises a sequential logic circuit implementing a finite state machine configured to manage an initialization mode, a reception mode and a transmission mode, wherein the control circuit is configured to start the initialization mode in response to an initialization request signal. For example, the initialization request signal may correspond to a signal provided by a power supply monitoring circuit, a request signal received from the processing circuit or a failure signal provided by the CAN communication controller circuit.

Specifically, in the initialization mode, the control circuit is configured to send a write request via the master communication interface in order to assert the bit CCE of the register CCCR. Moreover, the control circuit reads the first configuration data from the non-volatile memory and sends write requests via the master communication interface in order to store the first configuration data to the configuration and status registers. For example, in this way the first configuration data may comprise configuration data and/or the control circuit may be configured to store predetermined configuration data to the configuration and status registers in order to:

program the register RXBC in order to configure the start address of the memory area in the volatile memory adapted to store at least one reception buffer element, program the register TXBC in order to configure the start address of the memory area in the volatile memory adapted to store at least one transmission buffer element, optionally program the register SIDFC in order to configure the start address of the memory area in the volatile memory adapted to store at least one standard filter element; and optionally program the register XIDFC in order to configure the start address of the memory area in the volatile memory adapted to store at least one extended filter element.

Similarly, the control circuit reads the second configuration data from the non-volatile memory and stores the second configuration data via the memory interface circuit to the volatile memory. Specifically, in various embodiments, the second configuration data comprise at least one standard and/or extended filter element indicating that the received data should be stored to a given reception buffer element, such as the first reception buffer element.

Finally, the control circuit sends a write request via the master communication interface in order to de-assert the bit INIT of the register CCCR and activates the reception mode. Accordingly, in various embodiments, the hardware host configures during the initialization mode a reception buffer element, a transmission buffer element, and one or more standard and/or extended filter, wherein the standard and/or extended filter elements indicate that a received CAN message with a given standard or extended identifier should be stored to the reception buffer element.

Accordingly, in the reception mode, the control circuit may be configured to wait until the flag in the reception status register is asserted, thereby indicating that a CAN message has been received. In response to detecting that the flag in the reception status register is asserted, the control circuit may signal the reception of the CAN message to the processing circuit, read via the memory interface circuit a payload from the received CAN message stored to the reception buffer element and send the read payload to the processing circuit. Finally, the control circuit may send a write request via the master communication interface in order to de-assert the flag in the reception status register.

For example, in various embodiments, the volatile memory comprises a memory area having a plurality of memory locations, a memory controller configured to manage read and write operations accessing the memory locations of the memory area, and a memory status register comprising a respective memory status flag for each of the memory locations. Specifically, in various embodiments, the memory controller is configured to receive a write request for writing data to a given memory location of the volatile memory associated with the reception buffer element and, in response to receiving the write request, write the received data to the given memory location, and assert the memory status flag associated with the given memory location. Accordingly, in this case, the memory controller asserts the memory status flags associated with the memory locations of the reception buffer element to which the CAN communication controller circuit stores the received CAN message. Accordingly, in this case, the control circuit may read the content of the memory locations associated with the reception buffer element, which have asserted the respective memory status flag. However, in this case, the control circuit is also configured to, in response to detecting that the flag in the reception status register is asserted and once have sent the read payload to the processing circuit, de-assert the memory status flags associated with the memory locations of the reception buffer element.

In various embodiments, the control circuit monitors then a data transmission request signal provided by the processing circuit in order to determine whether the processing circuit requests the transmission of data in response to the received CAN message and, in response to determining that the processing circuit requests the transmission of data, the control circuit activates the transmission mode. Otherwise, the control circuit remains in the reception mode.

Specifically, in various embodiments, in the transmission mode, the control circuit is configured to receive a payload of a CAN message to be transmitted from the processing circuit and store via the memory interface circuit the received payload to the transmission buffer element. Next, the control circuit sends a write request via the master communication interface in order to assert the bit AR associated with the transmission buffer element in the register TXBAR in order to indicate that a CAN message stored to the transmission buffer element should be transmitted. Accordingly, the control circuit may wait until the flag in the transmission status register is asserted, thereby indicating that the CAN message has been transmitted. In response to detecting that the flag in the transmission status register is asserted, the control circuit may then send a write request via the master communication interface in order to de-assert the flag in the transmission status register, and activate again the reception mode.

Also in this case, the volatile memory may use the previously mentioned status flags in order to indicate the memory locations having stored valid data. Conversely, in other embodiments, the status flags are used to protect the memory locations, at least those associated with the transmission buffer element, against an overwrite operation. Specifically, in this case, the memory controller is configured to receive a write request for writing data to a given memory location of the volatile memory associated with the transmission buffer element and, in response to receiving the write request, determine whether the memory status flag associated with the given memory location is asserted. Specifically, in response to determining that the memory status flag associated with the given memory location is de-asserted, the memory controller writes the received data to the given memory location and asserts the memory status flag associated with the given memory location. Conversely, in response to determining that the memory status flag associated with the given memory location is asserted, the memory controller inhibits the writing of the received data to the given memory location. Accordingly, in this case, the memory controller asserts the memory status flags associated with the memory locations of the transmission buffer element to which the hardware host circuit stores the received payload. Accordingly, in this case, the control circuit is also configured to, in response to detecting that the flag in the transmission status register is asserted, de-assert the memory status flags associated with the memory locations of the transmission buffer element.

Accordingly, in various embodiments, the control circuit is configured to transmit data only once having received a CAN message, thereby implementing a CAN responder, wherein the CAN messages are exchanged by using a preferably a single reception buffer element and a single transmission buffer element. More specifically, in various embodiments, the hardware host circuit comprise also a CAN protocol management circuit. Specifically, this CAN protocol management circuit is configured to read the payload from the CAN message stored to the reception buffer element by reading via the memory interface circuit the CAN message stored to the reception buffer element, extracting the payload from the CAN message and sending the extracted payload to the processing circuit. Moreover, the CAN protocol management circuit may be configured to receive a payload of a CAN message from the processing circuit and store the received payload to the transmission buffer element by receiving the payload of a CAN message from the processing circuit, generating a CAN message by adding a CAN header to the received payload and storing via the memory interface circuit the generated CAN message to the transmission buffer element.

In various embodiments, the control circuit may be configured to determine that data have been received or have been transmitted by monitoring respective interrupt flags. In fact, typically the control and status registers also comprise:

a register "Interrupt Register", IR, configured to store interrupt flags, wherein a first interrupt flag of the register IR is associated with the flag in the reception status register indicating that a CAN message has been received and a second interrupt flag of the register IR is associated with the flag in the transmission status register in order to indicate that the CAN message has been transmitted, and a register "Interrupt Enable", IE, configured to store data used to enable or disable each of the interrupt flags of the register IE.

Accordingly, in this case, the control circuit may determine that the flag in the reception status register is asserted by monitoring the first interrupt flag of the register IR. Similarly, the control circuit may determine that the flag in the transmission status register is asserted by monitoring the second interrupt flag of the register IR. Specifically, in this case, the first configuration data comprise configuration data and/or the control circuit is configured to store predetermined configuration data to the configuration and status registers in order to program the register IE in order to enable the first interrupt flag associated with the flag in the reception status register indicating that a CAN message has been received and enable the second interrupt flag associated with the flag in the transmission status register in order to indicate that the CAN message has been transmitted.

In various embodiments, the control circuit may determine that data have been received or have been transmitted by using interrupt lines. In fact, typically the CAN communication controller circuit comprises a first interrupt line and a second interrupt line, and the configuration and status registers comprise:

a register "Interrupt Line Select", ILS, configured to assign an interrupt generated by a given interrupt flag from the register IR to the first interrupt line or the second interrupt line; and a register "Interrupt Line Enable" used to enable or disable each of the first interrupt line and the second interrupt line;

Accordingly, in this case, the control circuit may monitor the first interrupt flag of the register IR by monitoring the first interrupt line. Specifically, in this case, the first configuration data comprise configuration data and/or the control circuit is configured to store predetermined configuration data to the configuration and status registers in order to program the register ILS in order to assign the first interrupt flag to the first interrupt line, and program the register ILE in order to enable the first interrupt line.

Similarly, the control circuit may monitor the second interrupt flag of the register IR by monitoring the second interrupt line. Specifically, in this case, the first configuration data comprise configuration data and/or the control circuit is configured to store predetermined configuration data to the configuration and status registers in order to program the register ILS in order to assign the second interrupt flag to the second interrupt line, and program the register ILE in order to enable the second interrupt line.

BRIEF DESCRIPTION OF THE DRAWINGS

Embodiments of the present disclosure will now be described with reference to the annexed drawings, which are provided purely by way of non-limiting example and in which:

FIGS. 8 and 9 show operating states of the hardware host of FIG. 6 during the initialization phase;

FIGS. 14 and 15 show operating states of the hardware host of FIG. 6 during the data transmission phase.

DETAILED DESCRIPTION OF EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
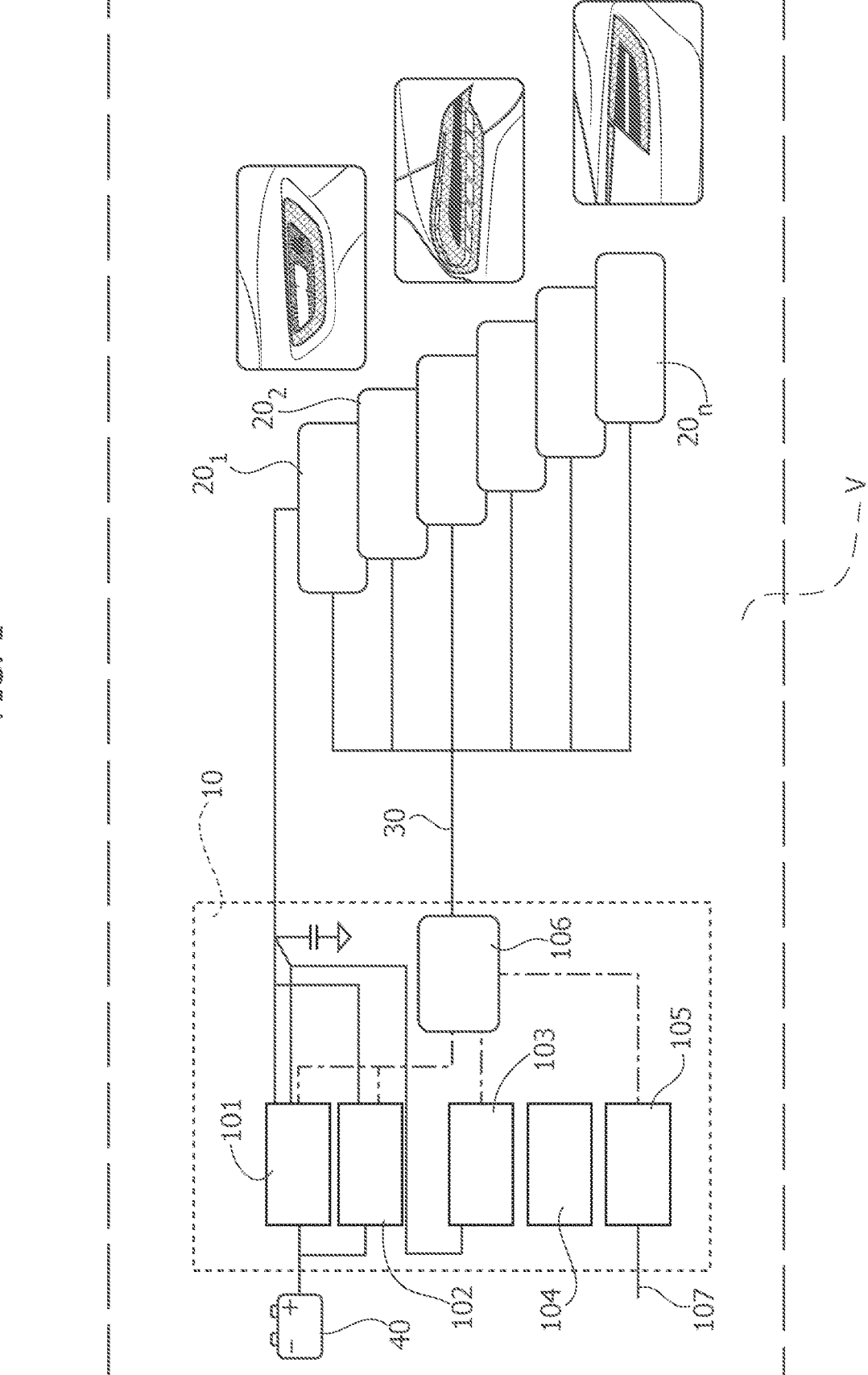
FIG. 1 shows an exemplary electronic system comprising a first and a second device configured to exchange data via a CAN bus.
Figure 2A:
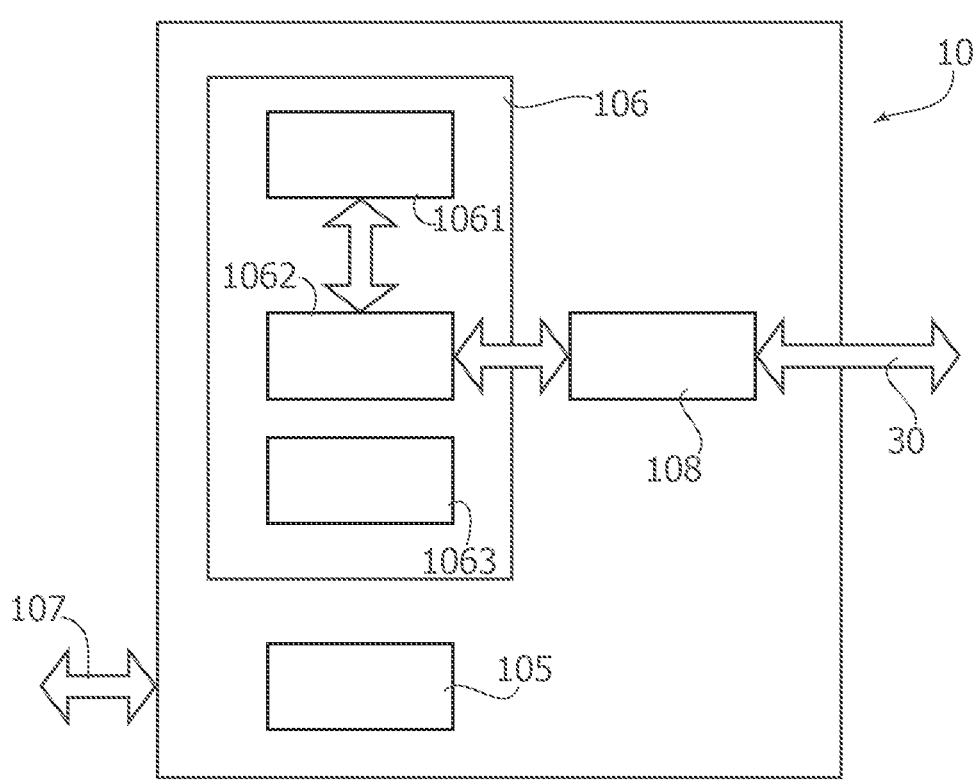
FIGS. 2A and 2B shows exemplary implementations of the first device and the second device, respectively.
Figure 2B:
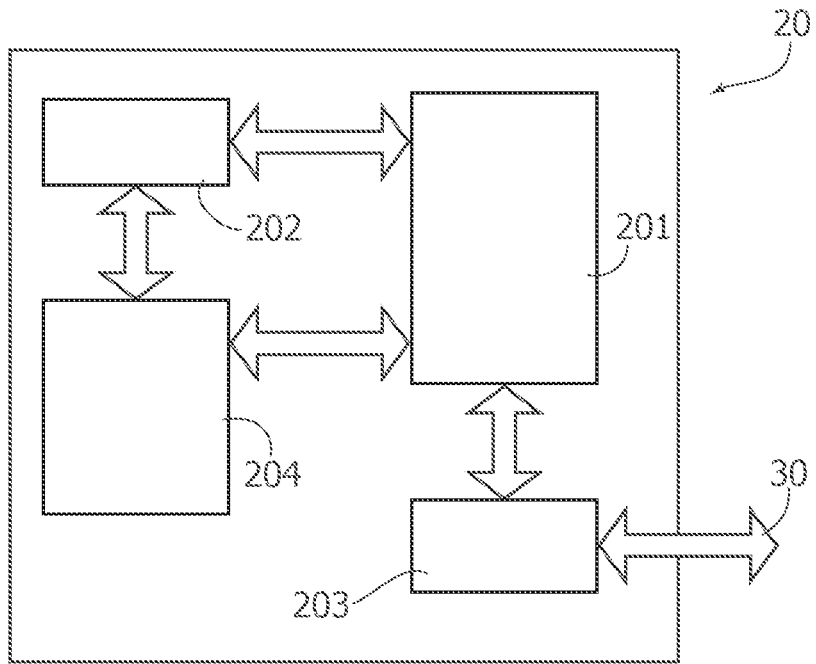

In the following FIGS. 3 to 16 parts, elements or components which have already been described with reference to FIGS. 1, 2A and 2B are denoted by the same references previously used in such Figure; the description of such previously described elements will not be repeated in the following in order not to overburden the present detailed description.

As described in the foregoing, processing systems 10 with CPU-based architectures, such as microcontrollers, may use the complex and modular M_CAN IP, which may be connected directly to an internal bus of the processing system 10. Conversely, devices 20 with low complexity and without a microprocessor, such as car LED lighting drivers, usually are just compatible with the simpler CAN FD Light protocol.

However, such CPU based devices 10 are often too complex and expensive for many applications. Conversely, CAN FD Light based devices 20 have limitations with respect to the support of the complete CAN-FD protocol implementation, such as the maximum bitrate, arbitration, bitrate switching between arbitration and data phases, error management, data buffering, etc. For this reason, the CAN FD Light protocol is well suited for local networks wherein only a single commander device is used, such as the bus 30 used to interface various LED drivers 20 with a light controller 10. Conversely, CAN FD Light compatible devices may usually not be used to interface a full CAN-FD bus, such as the main vehicle bus 107, because such a CAN bus 107 may comprises various commander devices, which start independently data transmission. However, this also implies that always a gateway device 10 is required in order to interface the local CAN-FD bus 30 with the vehicle bus 107.

Accordingly, in order to overcome the above drawbacks, it would be useful that also low-complexity devices 20 support the complete CAN/CAN-FD protocol, e.g., by using the M_CAN IP. In fact, in this way, one or more of the low-complexity devices 20 may also be connected directly to the bus 107. However, as mentioned before, the M_CAN IP is a complex core, which comprises a significant number of configuration registers, which are usually configured via a sequence of software instructions executed by a microprocessor.

Figure 3:
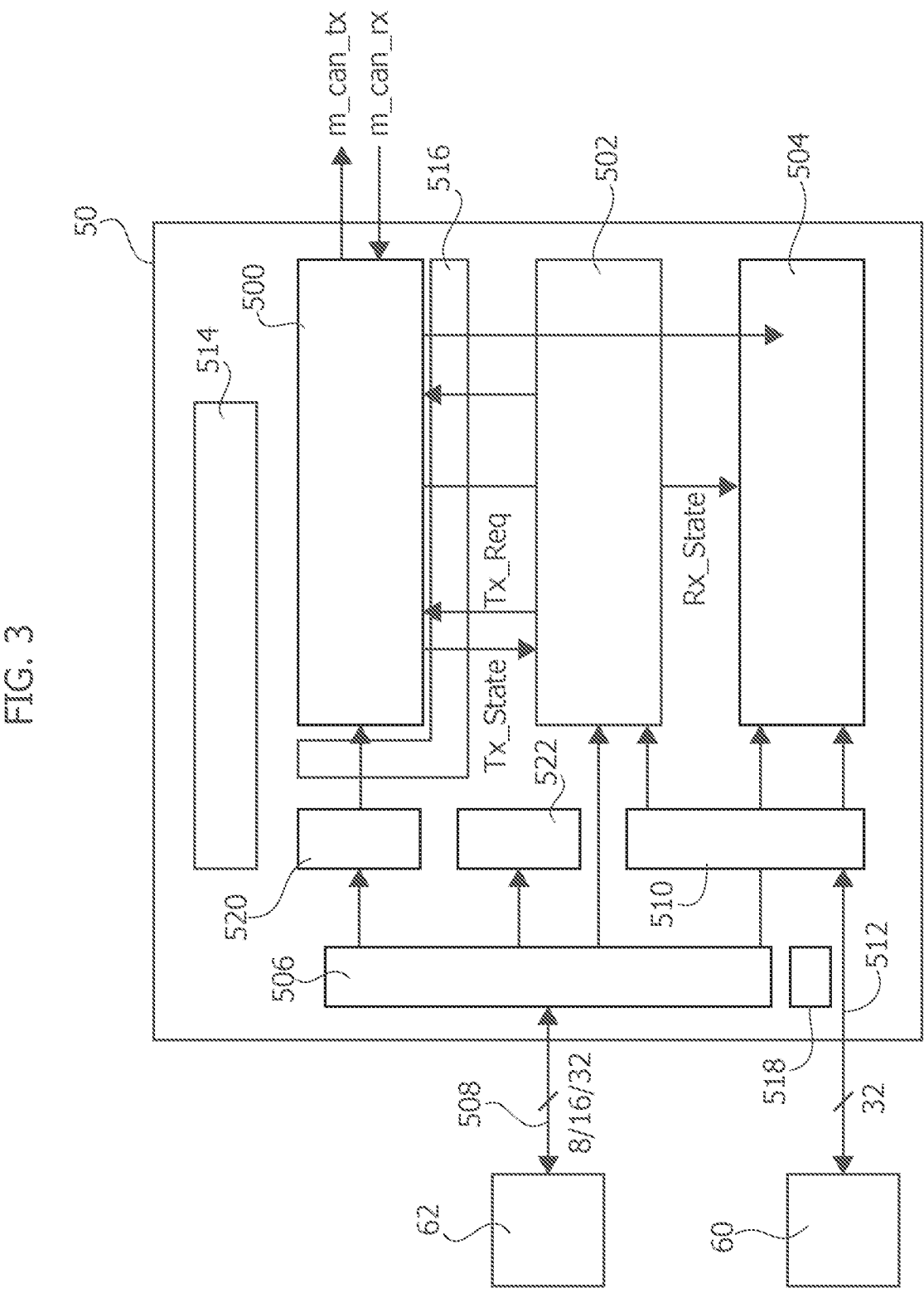
FIG. 3 shows a block diagram of the M_CAN IP circuit.

FIG. 3 shows in this respect the block diagram of the M_CAN IP 50, which is well-known in the art and used by the major microcontroller producers for automotive applications, such as Freescale Semiconductor/NXP Semiconductors or STMicroelectronics.

Specifically, the circuit 50 comprises a CAN core 500 which handles the generation of a serial transmission signal m_can_tx and the sampling of a serial reception signal m_can_rx. Specifically, the signals m_can_tx and m_can_rx are arranged to be connected to a CAN transceiver, typically a CAN FD transceiver. Specifically, the CAN core circuit 500 comprises a CAN Protocol Controller and Rx/Tx Shift Register, and is configured to handles all ISO 11898-1:2015 protocol functions. For example, the M_CAN core 500 supports 11-bit and 29-bit identifiers, arbitration, etc.

All functions concerning the handling of messages are implemented by a TX Handler 502 and a RX Handler 504. Specifically, in a M_CAN IP 50, the TX Handler 502 is configured to transfer a transmit messages from a message RAM 60 to the CAN core 500, which in turn transmits the data via the signal m_can_tx. For example, for this purpose, the TX Handler 502 may provide a request signal Tx_Req to the CAN core 500 requesting the transmission of data, and may monitor a status signal Tx_State provide by the CAN core 500. In a complementary manner, once the CAN core 500 receives data via the signal m_can_rx, which is, e.g., signaled via a status signal Rx_State, the RX Handler 504 manages the reception of data, in particular with respect to the message acceptance filtering, which is used to determine whether the CAN frame comprises an identifier associated with the M_CAN IP 50. Once a message has been accepted, the RX Handler 504 transfers the received messages from the CAN core 500 to the message RAM 60. The TX Handler 502 and the RX Handler 504 provide also status information, which, e.g., indicate that a message was transmitted or received.

Accordingly, the M_CAN IP 50 comprises a slave interface 506 for accessing the various configuration and status registers 520 of the circuit 50. Specifically, in an M_CAN IP, the slave interface 506 is a Generic Slave Interface arranged to connect the M_CAN IP 50 to a customer specific host CPU 62. The Generic Slave Interface 506 of the M_CAN IP is capable to be connect to an 8/16/32-bit bus 508 to support a wide range of interconnection structures.

Moreover, the M_CAN IP 50 comprises a master interface 510 for connecting the M_CAN IP 50 to the Message RAM 60. Specifically, the master interface, essentially implementing a Direct Memory Access (DMA) controller, is a Generic Master Interface using a 32-bit data bus 512.

Finally, the M_CAN IP 50 comprises an extension interface 514. All flags from an Interrupt Register as well as selected internal status and control signals are routed to this interface. For example, this interface 514 is intended to be connected to an interrupt unit of a microcontroller.

In addition to these circuits handling the configuration of the M_CAN IP 50 and the data exchange, the M_CAN IP 50 comprises further auxiliary circuits, such as:

a synchronization circuit 516 configured to synchronizes signals from the clock domain of the host circuit 62 to the CAN clock domain and vice versa;

a circuit 518 configured to synchronize a reset signal to the clock domain of the host circuit 62 and to the CAN clock domain; and a circuit 522 managing the interrupt control and a 16-bit CAN bit time counter for receive and transmit timestamp generation (an externally generated 16-bit vector may substitute the integrated 16-bit CAN bit time counter for receive and transmit timestamp generation).

Concerning the control and status registers 520, the M_CAN circuit 50 allocates an address space of 512 bytes. All registers are organized as 32-bit registers. As mentioned before, these registers are accessible by the Host CPU 62 via the Generic Slave Interface 506 using a data width of 8 bit (byte access), 16 bit (half-word access), or 32 bit (word access). The specific register map is described in greater detail in the previously cited user's manual of the M_CAN Controller Area Network provided by Bosch. Specifically various registers/bits are protected, which implies that write access by the host CPU 62 to these registers/bits is possible only when a bit "Configuration Change Enable" (CCE, bit 1) of a "CC Control Register" (CCCR, address 0x18) is set to high, i.e., CCCR.CCE='1', and a bit "Initialization" (INIT, bit 0) of the register CCCR is set to high, i.e., CCCR.INIT='1'.

Figures 4, 5:
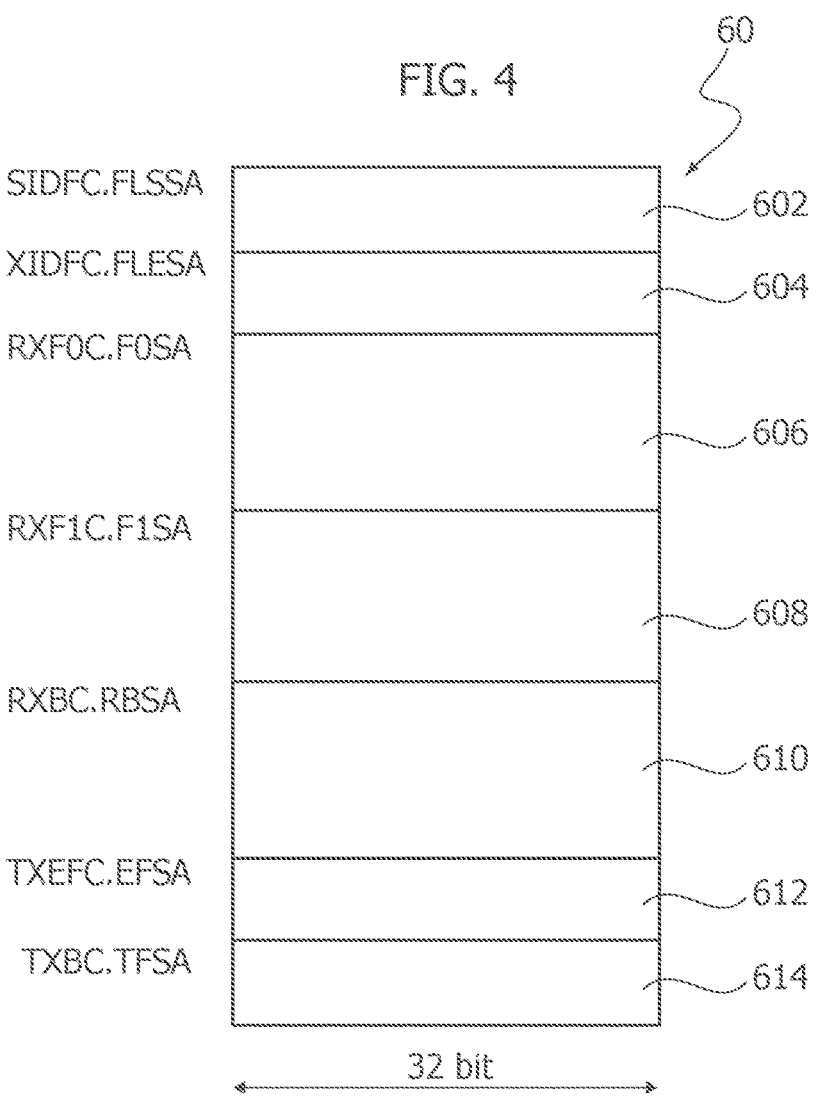
FIG. 4 shows an embodiment of the expected memory organization of the M_CAN IP circuit.
FIG. 5 shows an embodiment of a processing system according to the present disclosure.

FIG. 4 shows in this respect the organization of the message RAM 60.

Specifically, the message memory 60 is a standard 32-bit RAM. Specifically, this memory 60 is organized in the following memory areas:

a memory area 602 comprising up to 128 memory locations, which are used to store up to 128 filter rules for the message acceptance filtering applied to standard identifiers, the respective start-address of the memory area 602 is configured via a field "Filter List Standard Start Address" (FLSSA, bits 15 to 2) of a register "Standard ID Filter Configuration" (SIDFC, address 0x084);

a memory area 604 comprising up to 128 memory locations, which are used to store up to 64 filter rules for the message acceptance filtering applied to extended identifiers, the respective start-address of the memory area 604 is configured via a field "Filter List Extended Start Address" (FLESA, bits 15 to 2) of a register "Extended ID Filter Configuration" (XIDFC, address 0x088);

a memory area 606 comprising up to 1152 memory locations, which are used to store up to 64 RX elements, the respective start-address of the memory area 606 is configured via a field "Rx FIFO 0 Start Address" (FoSA, bits 15 to 2) of a register "Rx FIFO 0 Configuration" (RXF0C, address 0x0A0);

a memory area 608 comprising up to 1152 memory locations, which are used to store up to 64 RX elements, the respective start-address of the memory area 608 is configured via a field "Rx FIFO 1 Start Address" (F1SA, bits 15 to 2) of a register "Rx FIFO 1 Configuration" (RXF1C, address 0x0B0);

a memory area 610 comprising up to 1152 memory locations, which are used to store up to 64 Rx buffer elements, the respective start-address of the memory area 610 is configured via a field "Rx Buffer Start Address" (RBSA, bits 15 to 2) of a register "Rx Buffer Configuration" (RXBC, address 0x0AC);

a memory area 612 comprising up to 64 memory locations, which are used to store up to 32 TX event elements, the respective start-address of the memory area 612 is configured via a field "Event FIFO Start Address" (EFSA, bits 15 to 2) of a register "Tx Event FIFO Configuration" (TXEFC, address 0x0F0); and a memory area 614 comprising up to 576 memory locations, which are used to store up to 32 Tx buffer elements, the respective start-address of the memory area 614 is configured via a field "Tx Buffer Start Address" (TBSA, bits 15 to 2) of a register "Tx Buffer Configuration" (TXBC, address 0x0C0).

Thus, when using all memory areas 602-614, the memory 60 may comprise up to 4352 words, each having 32 bit.

Accordingly, as shown in FIG. 5, in order to use the M_CAN IP 50 without a microprocessor host 62, the host 62 has to be replaced with a host circuit 62a configured to manage directly in hardware the initialization, reception and transmission management of the M_CAN IP 50.

For example, in this way, a processing circuit 64, preferably comprising a hardware sequential logic circuit, may communicate with the hardware host circuit 62a in order to exchange data via the M_CAN IP 50. For example, in various embodiments, the hardware host 62a and the M_CAN IP 50 may implement the circuit 201 of the device 20 (FIG. 2B), wherein the processing circuit 64 corresponds to the circuit 204 and the message memory 60 corresponds to the memory 202. As will be described in greater detail in the following, in various embodiments, the processing circuit 64 does not communicate directly with the message memory 60, but the hardware host circuit 62a manages the data exchange between the processing circuit 64 and the message memory 60.

Generally, the M_CAN IP 50 supports various different configurations. In this respect, the inventors have observed that devices without microprocessor are mainly used for low-complexity devices, such as the devices 20 used to drive actuators, such as LED drivers. Usually, such devices 20 do not implement CAN commanders, but just responders. Accordingly, in various embodiments of the present disclosure, the M_CAN IP 50 is just used in a commander-responder scenario, wherein the M_CAN IP 50 is used as a responder, which transmits data in response to a communication request received from a commander, e.g., the device 10, i.e., the M_CAN IP 50 does not initiate transactions autonomously, without a request from a commander device.

In fact, these assumptions permit to define a simpler and more cost-effective implementation. For example, this permits to reduce the size of the memory 60, because a FIFO in the data transmission path and/or the data reception path may be omitted. Similarly, only a reduced set of features of the M_CAN IP 50 has to be managed by the host 62a in order to guarantee CAN communication, which also implies that just a subset of registers 520 has to controlled in order to support these features.

Figure 6:
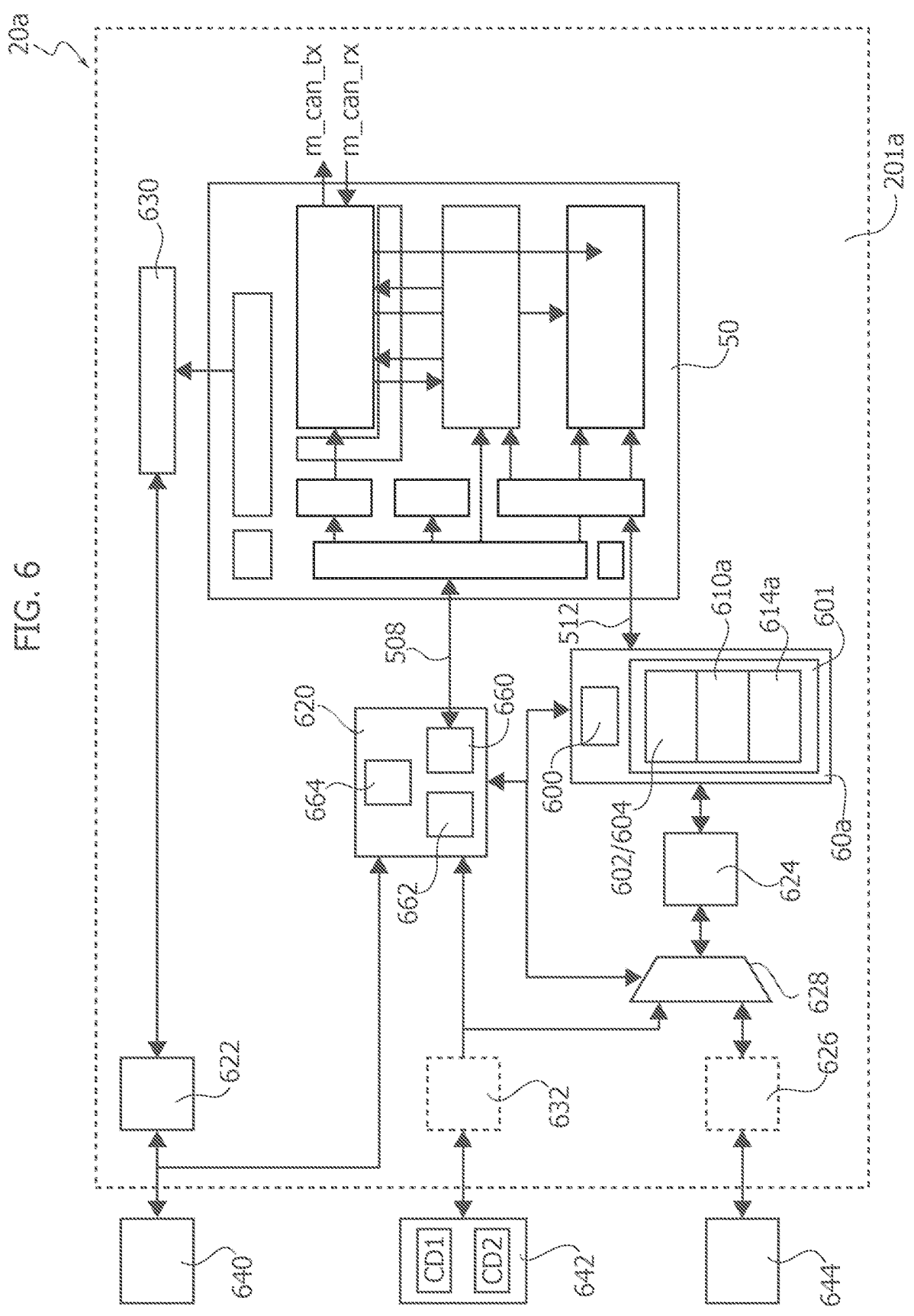
FIG. 6 shows a further embodiment of a processing system according to the present disclosure, wherein the processing system comprises a M_CAN IP circuit and a hardware host managing the operation of the M_CAN IP circuit.

FIG. 6 shows an embodiment of a device 20a according to the present disclosure.

Specifically, as mentioned before, the device 20a comprises a CAN communication and protocol controller circuit 201a, which is implemented with a M_CAN IP circuit 50 and a hardware host circuit 62a.

In the embodiment considered, the hardware host circuit 62a comprises a control circuit 620 configured to manage the various states of the hardware host 62a and the M_CAN IP programming. Accordingly, in various embodiments, the control circuit 620 comprises a (hardware) sequential logic circuit 644 managing various phases of the hardware host 62a, and which implements a finite state machine (FSM). Specifically, in order to communicate with the M_CAN IP 50, in particular with the slave interface 506, the control circuit 620 comprises a master communication interface 660 connected via the bus 508 to the M_CAN IP 50, in particular the respective slave interface 506. Accordingly, in the embodiment considered, the control circuit 620 may read and write the control and status registers 520 of the M_CAN IP 50 by sending via the master communication interface 660 read or write requests to the slave interface 506 of the M_CAN IP 50.

In the embodiment considered, the CAN communication and protocol controller circuit 201a has associated also a memory 60a, which may be internal or external with respect to the CAN communication and protocol controller circuit 201a. Specifically, as usual, this memory, such as a Random Access Memory (RAM), comprises a memory area 601 and a memory controller 600 configured to manage read and write operations accessing the memory area 601.

Specifically, in the embodiment considered, this memory 60a represents the message memory for the M_CAN IP 50. Accordingly, in the embodiment considered, the memory controller 600 is connected to the master interface 510 of the M_CAN IP 50, whereby the M_CAN IP 50 may read data from and write data to the memory 60a.

In the embodiment considered, the hardware host 62a comprises also a set of status registers 622. Specifically, the control circuit 620 may store one or more status flags to the registers 622. In various embodiments, the hardware host 62a comprises also an interrupt control circuit 630 configured to monitor the interrupt lines of the M_CAN IP 50. Accordingly, in response to detecting an interrupt, the interrupt control circuit 630 may store one or more flags to the status registers 622 and/or signal the interrupt to the control circuit 620.

As mentioned before, in various embodiments, the hardware host circuit 62a does not directly access the message memory 60a. Specifically, as described in the foregoing, this memory 60a is used to store:

the filter rules for the data reception, in particular the standard and/or extended filter elements, the data received by the M_CAN IP 50, which (based on the configuration) are store to the Rx FIFO 0, the RX FIFO 1 or the Rx Buffers, and the data to be transmitted by the M_CAN IP 50, which (based on the configuration) are store to the Tx FIFO or the Tx Buffers.

For example, in various embodiments, the circuit 201a is configured to use a single Rx buffer element 610a in the Rx Buffers 610, such as the first Rx buffer element, and a single Tx buffer element 614a in the Tx Buffers 614, such as the first Tx buffer element, which permits to significantly reduce the size of the memory. In various embodiments, the circuit Zola permits to configure at least one standard filter element, and optionally one or more extended filter elements. Specifically, in various embodiments, theses filter elements have stored data to indicate that the data received by the M_CAN IP 50 should be stored to the Rx buffer element 610a, i.e., the memory locations in the memory 60a associated with the Rx buffer element 610a.

Accordingly, in the embodiment considered, the memory controller 600 is also connected to a memory interface 624 of the hardware host 62a. Specifically, this memory interface 624 is used to:

write the filter rules to the filter rule memory area 602 and/or 604;

read received data from the memory 60a, e.g., from the Rx buffer element 610a; and write data to be transmitted to the memory 60a, e.g., to the Tx buffer element 614a.

As will be described in greater detail in the following, the filter rules are configured during an initialization phase, while the data reception and data transmission are managed during further phases. In this respect, during the initialization phase two types of configuration data have to be processed:

first configuration data CD1 comprising one or more configuration data to be stored to the registers 520 of the M_CAN IP 50; and second configuration data CD2 comprising one or more standard and/or extended filter elements to be stored to the memory areas 602 and 604.

In addition to these programmable configuration data, the control circuit 620 may also automatically write further predetermined configuration data to the control registers 520 of the M_CAN IP 50. For example, the configuration data CD1 and/or the predetermined configuration data may be used to configure:

the field FLSSA of the register SIDFC in order to program the start address of the of the memory area 602 and a field "List Size Standard" (LSS, bits 23 to 16) of the register SIDFC in order to program the respective maximum number of standard filter elements;

the field FLESA of the register XIDFC in order to program the start address of the of the memory area 604 and a field "List Size Extended" (LSE, bits 22 to 16) of the register XIDFC in order to program the respective maximum number of extended filter elements;

the field RBSA of the register RXBC in order to program the start address of the of the Rx Buffers 610;

the field TBSA of the register TXBC in order to program the start address of the of the Tx Buffers 614.

In general, the size of the Rx buffer element 610a and/or the Tx buffer element 614a may be programmable externally (and may thus be included in the configuration data CM) or the control circuit 620 may program a predetermined size. For example, the size of the Rx buffer element 610a may be specified via a field "Rx Buffer Data Field Size" (RBDS, bits 10 to 8) of a register "Rx Buffer/FIFO Element Size Configuration" (RXESC, address 0xBC). Similarly, the size of the Tx buffer element 614a may be specified via a field "Tx Buffer Data Field Size" (TBDS, bits 2 to 0) of a register "Tx Buffer Element Size Configuration" (TXESC, address 0x0C8).

Accordingly, in various embodiments, during the initialization phase, the first configuration data CD1 are provided to the control circuit 620, which stores the first configuration data CD1 and optional further predetermined configuration data via the master interface 660 to the registers 520 of the M_CAN IP circuit 50. Conversely, the second configuration data CD2 are provided to the memory interface 624, which stores the second configuration data CD2 to the memory boa, in particular to the memory areas 602 and/or 604.

As shown in FIG. 6, in various embodiments, the configuration data CD1 and CD2 are stored to a non-volatile memory 642. Generally, this memory may be internal or external with respect to the hardware host 62a. As schematically shown in FIG. 6, in order to read the data from the non-volatile memory 642, the hardware host 62a may comprise a hardware configuration circuit 632 for the non-volatile memory 642. Specifically, once the control circuit 620 signals the start of the initialization phase, the hardware configuration circuit 632 may:

sequentially read the configuration data CD1 from the memory 642 and provide the configuration data CD1 to the control circuit 620; and sequentially read the configuration data CD2 from the memory 642 and provide the configuration data CD2 to the memory interface circuit 624.

Conversely, during the data reception and transmission operation, the memory 60a should be interfaced with an external processing circuit 64. For example, in FIG. 6 are shown a control circuit 640 and a data interface circuit 644 of the processing circuit 64. Accordingly, in various embodiments, during the data reception and transmission phases, the memory interface 624 is connected to the processing circuit 64, e.g., the data interface circuit 644, which is schematically shows via a multiplexer 628 configured to connect the memory interface 624:

during the initialization phase, to the non-volatile memory 642, e.g., via the hardware configuration circuit 632, and during the reception or transmission phase, to the processing circuit 64, e.g., data interface circuit 644.

For example, the multiplexer 628 may be drive via the control circuit 620, which signals that the hardware host 62a is in the initialization phase, the reception phase or the transmission phase. For example, the respective control signals may be generated by a memory interface control circuit 662 of the control circuit 620, which may also monitor the operation of the memory interface 624 and/or the memory 60a.

In various embodiments, the hardware host 62a may not directly transmit the received data to the processing circuit 64, but the hardware host 62 may comprise a CAN protocol management circuit 626 configured to manage the network layer of the CAN protocol. For example, this circuit 626 may process the CAN frame stored to the Rx buffer element 610a and just forward the payload of the frame to the processing circuit 64. Similarly, the CAN protocol management circuit 626 may receive data from the processing circuit 64, generate a respective CAN frame, e.g., by adding CAN header data, and store the CAN frame to the Tx buffer element 614a.

In the following will now be described possible embodiments of the initialization, reception and transmission management of the M_CAN IP 50.

Figure 7:
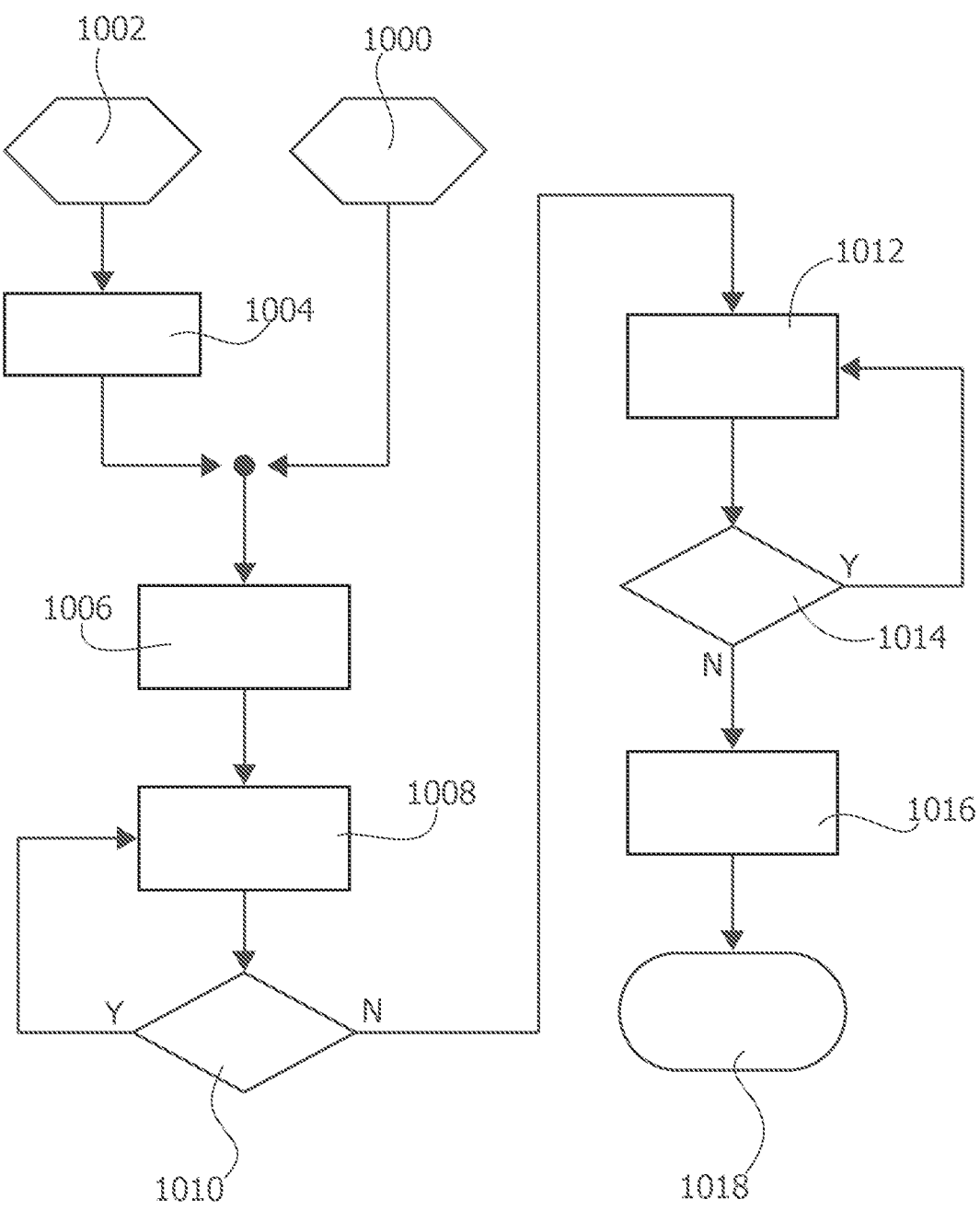
FIG. 7 shows an embodiment of the operation of a hardware host of FIG. 6 during an initialization phase.

Specifically, FIG. 7 shows an embodiment of the operation of the hardware host 62a for initializing and configuring the M_CAN IP 50.

In general, the initialization phase of the M_CAN IP, is started when the bit INIT of the register CCCR is set to high, i.e., CCCR.INIT='1'. According to the M_CAN documentation, the bit CCCR.INIT is automatically set to high, thereby starting the initialization phase of the M_CAN IP, in response to a set of hardware events 1000, such as a hardware reset, a power down (sleep mode), a bus OFF state or a message memory corruption. Accordingly, in this case, the hardware host 62a does not have to assert the bit CCCR.INIT. Conversely, in case of other events 1002, which should initialize the M_CAN IP 50, such as a resume from a fail-safe condition, the hardware host 62a starts explicitly the initialization phase by setting the bit CCCR.INIT to high in a step 1004. Specifically, for this purpose, the hardware host 62a sends a write request to the slave interface 506, wherein the write request comprises the address associated with the register CCCR, e.g., the address 0x018. Setting the bit CCCR.INIT to high just starts the initialization phase and per se does not change any configuration register.

Accordingly, in order to enable the configuration of the M_CAN IP 50, the hardware host 62a sets then in a step 1006 the bit CCE of the register CCCR to high by sending a respective write request to the slave interface 506 i.e., CCCR.CCE='1'. Specifically, the bit CCCR.CCE can only be set/reset while the bit CCCR.INIT is set to high.

Once the configuration of the M_CAN IP 50 has been enabled, a sequence of accesses to the slave interface 506 have to be performed in order write the configuration registers 520 of the M_CAN IP 50.

Figure 8:
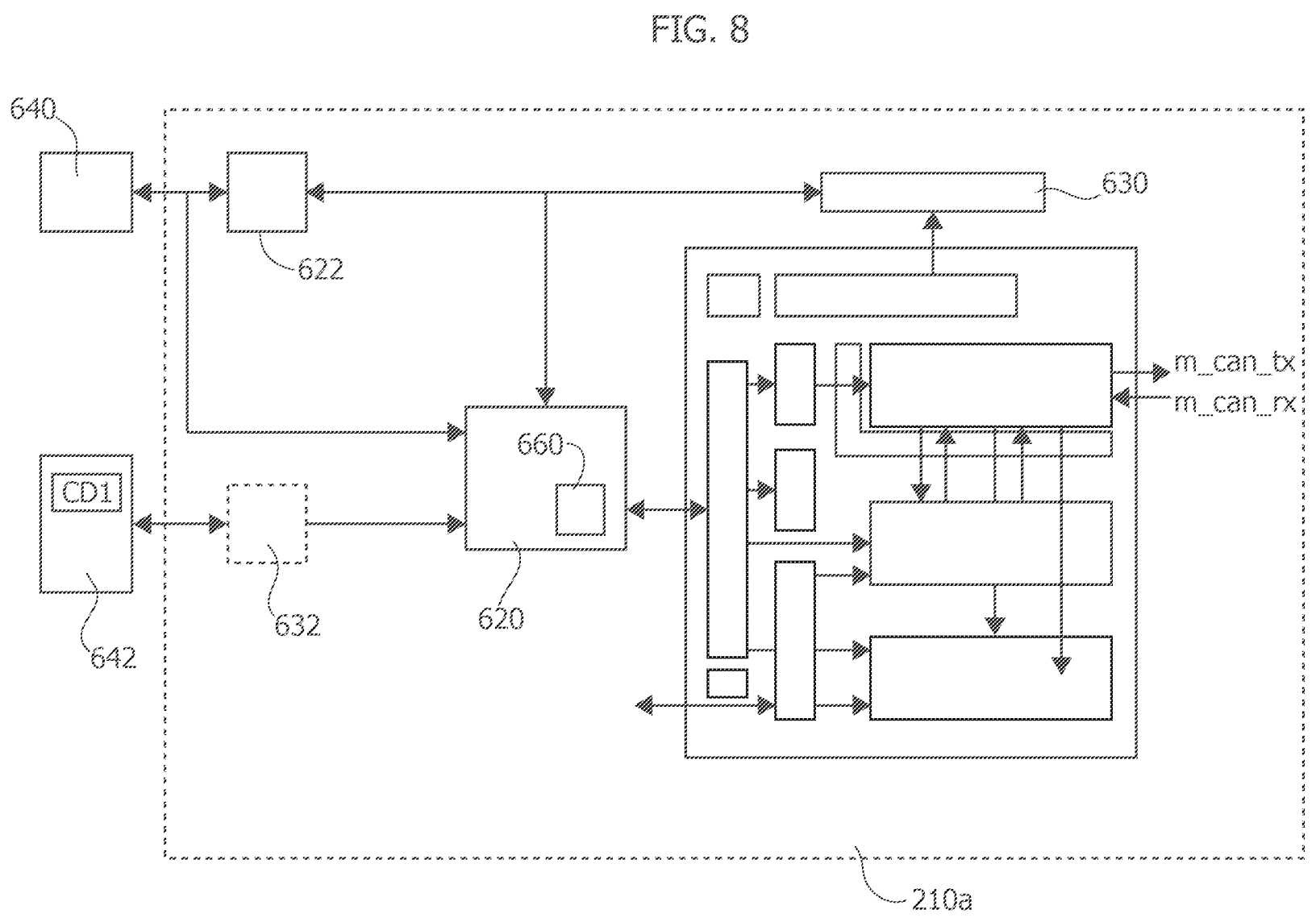

For example, as shown in FIG. 8, for this purpose, the control circuit 620 may activate a first initialization state INIT_REGISTERS. Specifically, during the state INIT_REGISTERS, the control circuit 620 receives the first configuration data CD1 from the non-volatile memory 642, e.g., via the hardware configuration circuit 632, and the master interface 660 stores the respective configuration data to the registers 520 of the M_CAN IP 50.

For example, for this purpose, the configuration data CD1 may comprise a sequence of memory slots, wherein each memory slot is univocally associated with a given register 520, e.g., the first slot is associated with the first register 520, the second slot is associated with the second register 520, etc. Accordingly, in this case, the hardware circuit may sequentially read the memory locations of the non-volatile memory 642 and store the read data to the respective register. Alternatively, the configuration data CD1 may be stored as data packets, wherein each data packet comprises the address of a respective register 520 and the respective configuration data to be stored the register 520.

Accordingly, as schematically shown in FIG. 7, the hardware host 62a sends in a step 1008 a given set of configuration data to a respective configuration register 520 of the M_CAN IP 50 and verifies at a step 1010 whether further configuration data have to be processed. Accordingly, in case further configuration data have to be processed (output "Y" of the verification step 1010), the hardware host 62a selects the next configuration data and returns to the step 1008. Conversely, in case all configuration data have been processed (output "N" of the verification step 1010), the hardware host 62a proceeds to a step 1012.

Accordingly, in the embodiment considered, the steps 1008 and 1010 are used to sequentially store the first set of configuration data CD1 to the configuration registers 520 of the M_CAN IP 50 via the master interface 660 and the slave interface 506. However, as mentioned before, for a correct operation of the M_CAN IP 50, also one or more standard filter elements and/or extended filter elements have to be stored to the memory areas 602 and/or 604 of the message RAM 60a.

Figure 9:
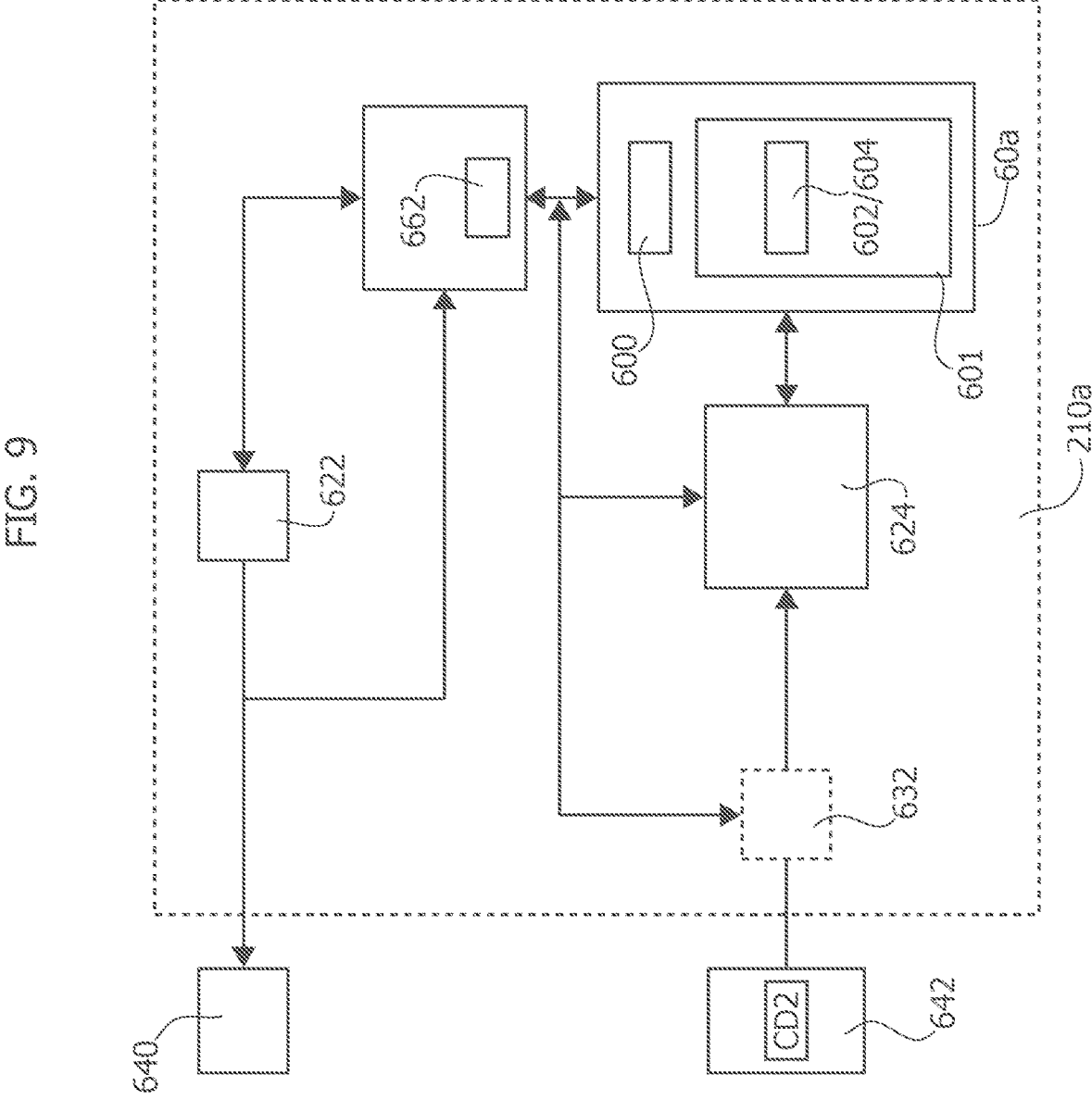

For example, as shown in FIG. 9, for this purpose, the control circuit 620 may activate after the first initialization state INIT_REGISTERS (steps 1008 and 1010) a second initialization state INIT_MEMORY. Specifically, during the state INIT_MEMORY, the memory interface 624 receives the second configuration data CD2 from the non-volatile memory 642, e.g., via the hardware configuration circuit 632, and the memory interface 624 stores the respective configuration data to the memory 60a. Specifically, as mentioned before, the configuration data CD2 comprises at least one standard and/or extended filter element. Generally, also in this case, each memory location of the non-volatile memory 642 may be associated univocally with a given address of the memory 60a or the configuration data CD2 may be stored in the form of data packets, wherein each data packet comprises the address of a respective memory location in the memory 60a and the respective configuration data to be stored the memory 60a.

This is also shown in FIG. 7, wherein the hardware host 62a stores in the step 1012 a given set of configuration data to a respective memory slot of the message RAM 60a and verifies in a step 1014 whether further configuration data have to be processed. Accordingly, in case further configuration data have to be processed (output "Y" of the verification step 1014), the hardware host 62a selects the next configuration data and returns to the step 1012. Conversely, in case all configuration data have been processed (output "N" of the verification step low), the hardware host 62a proceeds to a step 1014. Accordingly, in the embodiment considered, the steps 1012 and 1014 are used to sequentially store the second set of configuration data CD2 to the memory 60a, in particular in order to program one or more standard filter elements and/or extended filter elements to the memory areas 602 and/or 604.

Finally, once the M_CAN IP 50 has been configured, i.e., once the configuration registers 520 and the filter elements have been configured, the hardware host 62a sets in a step 1016 the bit CCE of the register CCCR via the slave interface 506 to low, i.e., CCCR.CCE='o', and the initialization phase terminates in a stop step 1018. For example, for this purpose, the control circuit 620 may activate a third initialization state INIT_END at the end of the second initialization state INIT_MEMORY (steps 1012 and 1014), wherein the control circuit 620 stores one or more predetermined configuration data to the registers 520, at least in order to set the bit CCE of the register CCCR to low.

Accordingly, once the configuration data have been stored to the registers 520 and the memory 60a, the M_CAN IP 50 is configured to transmit and receive data. Specifically, as mentioned before, in various embodiments, the hardware host 62a is configured to transmit data only once having received data.

Specifically, as described with respect to FIG. 7, during the initialization phase, the hardware host 62a stores first configuration data CD1 (and possibly further predetermined configuration data) to the registers 520 and second configuration data CD2 to the memory 60a. In particular the hardware host 62a stores one or more filter elements to the memory areas 602 and/or 602 of the memory 60a.

Accordingly, in order to correctly configure the M_CAN IP 50 for data reception, the configuration data should configure at least one filter element and at least one Rx element, which in general may be stored to the Rx FIFO 0 (memory area 606), the Rx FIFO 1 (memory area 608) and/or a Rx buffer element of the Rx Buffers 610.

For example, apart from the general configuration registers of the M_CAN IP, the maximum number of standard ID filter elements may be configured via the field LSS of the register SIDFC and the maximum number of extended ID filter elements may be configured via the field LSE of the register XIDFC. Accordingly, these configuration data may be included in the configuration data CD1 and/or the predetermined configuration data. Conversely, the meaning of the standard message ID filter element and the extended message ID filter element is directly specified via fields in the respective ID filter element, such as the field "Standard Filter Element Configuration" (SFEC, bits 29 to 27) of a 32 bit standard message ID filter element, or the fields "Extended Filter Element Configuration" (EFEC, bits 63 to 61) and "Extended Filter Type" (EFT, bits 31 to 30) of a 64 bit extended message ID filter element. For example, the fields SFEC and EFEC permit to specify whether the respective received message has to be stored to the Rx FIFO 0 (memory area 606), the Rx FIFO 1 (memory area 608) or the Rx Buffers 610.

Similarly, the M_CAN IP 50 comprises configuration registers 520 for configuring the Rx FIFO 0 (memory area 608), the Rx FIFO 1 (memory area 608) and the Rx Buffers 610. For example, a field "Rx FIFO 0 Size" (F0S, bits 22 to 16) of the register RXF0C and the field "Rx FIFO 1 Size" (F1S, bits 22 to 16) of the register RXF1C configure the maximum number of received elements to be stored in the Rx FIFO 0 and the Rx FIFO 1, respectively.

Accordingly, in general, based on the dimension of the message RAM 60, different configurations may be adopted, e.g., with respect to the maximum dimension of each received element to be stored to the Rx FIFO 0, the Rx FIFO 1 or the Rx Buffers, the maximum number of received elements to be stored to the Rx FIFO 0 and the Rx FIFO 1, etc.

In this respect, as mentioned before, in various embodiments, the hardware host 62a uses only a single Rx buffer element 610a in the Rx Buffers 610. For this reason, the hardware host 62a may omit the configuration of the Rx FIFO 0 and the Rx FIFO 1. In this respect, the number of elements in the Rx Buffers 610 may not be specified for the M_CAN IP 50. However, in various embodiments, the configuration data CD1 and/or the predetermined configuration data may be used to specify the start address of the Rx Buffers and the size of the Rx buffer elements, and the configuration data CD2 comprise one or more filter elements indicating that the respective received data should be stored to a given Rx buffer element 610a, such as the first Rx buffer element of the Rx Buffers 610. For example, in order to select the Rx Buffers 610, a standard filter element has the field SFEC set to "111" and a field "Standard Filter ID 2" (SFID2, bits 10 to 0) is used to select a given buffer element. For example, by setting the bits SFID2[10:9] to "00" and the bits SFID2[5:0] to "000000", the first Rx buffer element 610a in the Rx Buffers 610 is selected. Similarly, an extended filter element has the field EFEC set to "111" and a field "Extended Filter ID 2" (EFID2, bits 28 to 0) is used to select a given buffer element. For example, by setting the bits EFID2[10:9] to "00" and the bits EFID2[5:0] to "000000", the first Rx buffer element 610a in the Rx Buffers 610 is selected. In this respect, a field "Standard Filter ID 1" (SFID1, bits 26 to 16) of a standard filter element or "Extended Filter ID 1" (EFID1, bits 60 to 32) of an extended filter element permits to specify the ID of a standard or an extended message, respectively. Accordingly, when a received CAN message contains the ID specified via the field SFID1 of a standard filter element or EFID1 of an extended filter element, the CAN message is stored, e.g., to the Rx buffer element 614a selected via the respective field SFID2 or EFID2.

Figure 10:
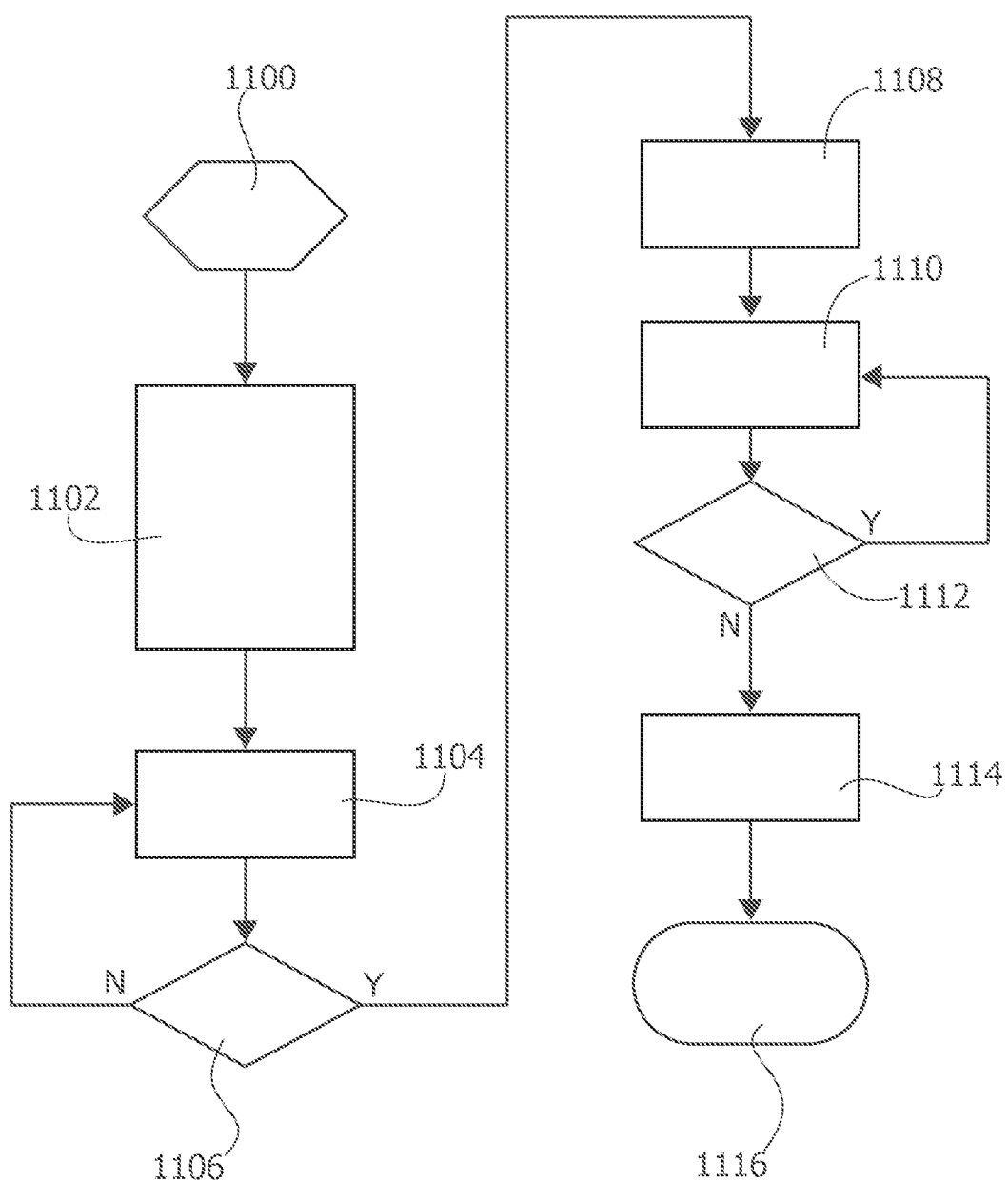
FIG. 10 shows an embodiment of the operation of a hardware host of FIG. 6 during a data reception phase.

FIG. 10 shows in this respect an embodiment of the operation of the hardware host 62a for receiving data.

As mentioned before, once having correctly configured the configuration registers 520 and having stored at least one standard or extended ID filter element to the memory areas 602 and/or 604, the M_CAN IP 50 is ready to receive a message, as schematically shown via a step 1100. Accordingly, in a step 1102, the M_CAN IP 50 may receive a message via the line m_can_rx, verify whether one of the standard or extended ID filter elements stored to the memory areas 602 and/or 604 applies to the received message, and then either accepts or rejects the received message. Specifically, in case a message is accepted, the M_CAN IP 50 stores the receive message to the Rx FIFO 0, the Rx FIFO 1 or the Rx Buffers based on the respective configuration of the filter element. As mentioned before, in various embodiments, the filter elements have stored data to indicate that the received message should be stored to a given Rx buffer element 610a of the Rx Buffers 610, such as the first Rx buffer element.

Figure 11:
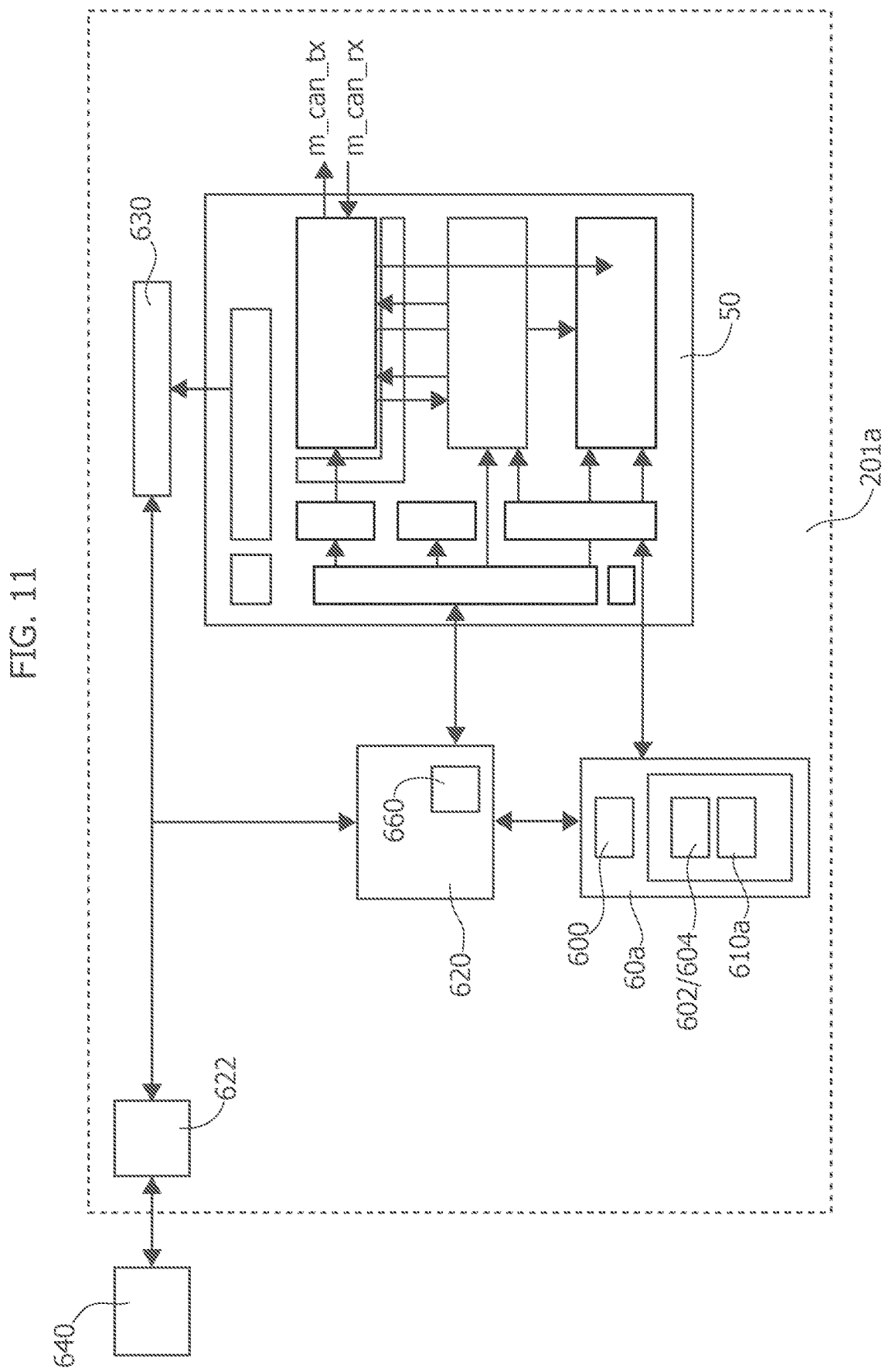
FIGS. 11 and 12 show operating states of the hardware host of FIG. 6 during the data reception phase.

This operation is also shown in FIG. 11, wherein the M_CAN IP 50 stores a receive message to the memory locations associates with the Rx buffer element 610a of the Rx Buffers 610 as indicated by the filter element applying to the received message.

Generally, in order to detect the reception of new data, the hardware host 62a may monitor via the master interface 660 one or more status registers 520 of the M_CAN IP 50 and/or via the interrupt management circuit 630 one or more interrupt lines provided by the M_CAN IP circuit 50.

Specifically, the M_CAN IP 50 is configured to store the interrupt flags to the register "Interrupt Register" (IR, address 0x050), wherein the register "Interrupt Enable" (IE, address 0x054) may be used to enable or disable the mapping of specific interrupts to the interrupt lines. Moreover, the register "Interrupt Line Select" (ILS, address 0x058) permits to assign an interrupt generated by a specific interrupt flag from the register IR to one of two interrupt lines. In this respect, the register "Interrupt Line Enable" (ILE, 0x05C) permits to enable each of the two interrupt lines.

Thus, by configuring the registers IE, ILS and ILE, the M_CAN IP 50 may be configured to signal the arrival of a new message, e.g., via the flags "Dedicated Rx Buffer Interrupt Enable" (DRXE, bit 19), "Rx FIFO 0 New Message Interrupt Enable" (RF0NE, bit 0) and/or "Rx FIFO 1 New Message Interrupt Enable" (RF1NE, bit 4) of the register IE, and map the respective interrupt to the interrupt lines m_can_int0 and/or m_can_int1 of the extension interface 514 via the flags "Dedicated Rx Buffer Interrupt Line" (DRXL, bit 19), "Rx FIFO 0 New Message Interrupt Line" (RF0NL, bit 0) and/or "Rx FIFO 1 New Message Interrupt Line" (RF1NL, bit 4) of the register ILS. For example, when using a Rx buffer element 610a of the Rx Buffers 610, the first configuration data CD1 and/or the predetermine configuration data (transmitted to the registers 520) may set the flag DRXE of the register IE, enable at least one of the interrupt lines m_can_int0 and/or m_can_int1 via the flags "Enable Interrupt Line 0" (EINT0, bit 0) and "Enable Interrupt Line 1" (EINT1, bit 1) of the register ILE, and map the interrupt "Message stored to Dedicated Rx Buffer" (DRX) to one of the enabled interrupt lines via the flag DRXL of the register ILS.

Thus, in this way, the M_CAN IP 50 signals the reception of data via a first interrupt line selected amongst the interrupt lines m_can_int0 or m_can_int1. Thus, the hardware host 62a may monitor in a step 1104, e.g., via the interrupt management circuit 630, the interrupt lines m_can_int0 or m_can_int1 in order to determine whether an interrupt was generated. In case plural interrupts are mapped to the same interrupt line, in response to the interrupt, the hardware host 62a may then use the interrupt management circuit 630 in order to read the content of the interrupt flags stored to the register IR, which is accessible via the extension interface 514. Accordingly, in various embodiments, instead of monitoring the interrupt lines m_can_int0 or m_can_int1, the hardware host 62a may monitor in the step 1104, e.g., via the interrupt management circuit 630, also directly the register IR.

Alternative, the hardware host 62a may use the master interface 660 for reading the content of one or more registers 520 in order to determine, which interrupt was generated, e.g., by reading the register IR. Moreover, in various embodiments, based on the specific configuration, the hardware host 62a may read in the step 1104 also the content of the register "Rx FIFO 0 Status" (RXF0S, address 0x0A4), the register "Rx FIFO 1 Status" (RXF1S, address 0x0B4) and/or the buffer status registers, typically the register "New Data 1" (NDAT1, address 0x098) and optionally the register "New Data 2" (NDAT2, address 0x09C), in order to determine where the received data have been stored. For example, by reading the content of the bit ND0 (bit 0) of the register NDAT1, the hardware host 62a may determine that new data have been stored to the first Rx buffer element 610a of the Rx Buffers 610.

Instead of monitoring the interrupt lines, the hardware host 62a may also determine that new data have been received by periodically monitoring in the step 1104 one or more status registers 520 via the slave interface 506, such as the registers IR, or directly the registers RXF0S, RXF1S, NDAT1 and/or NDAT2. For example, when using the first Rx buffer element 610a of the Rx Buffers 610, the control circuit 620 may monitor periodically the bit ND0 of the register NDAT1.

Accordingly, as schematically shown via a verification step 1106, in case the hardware host 62a determines that no new message has been received (output "N" of the verification step 1106), the hardware host 62a returns to the step 1104 for monitoring again the interrupt lines and/or status registers 520. Conversely, in case the hardware host 62a determines that a new message has been received (output "Y" of the verification step 1106), the hardware host 62a proceeds to a step 1108.

For example, in various embodiments, the hardware host 62a signals in the step 1108 the reception of data also to the processing circuit 64, e.g., via an interrupt signal or another control signal. For example, in the embodiment shown in Figure ii, the interrupt management circuit 630 may directly store the status of the interrupt lines m_can_int0 and/or m_can_int1 to the status registers 622 and/or, once having determined that new data have been stored to the Rx buffer element 610a of the Rx Buffers 610, the control circuit may assert a flag in the status registers 622. Generally, the status registers 622 may be read via read requests send by the control circuit 640 and/or one or more of the flags of the status register 622 may be connected to the control circuit 640 via dedicated lines, e.g., representing interrupt lines.

Accordingly, once the reception of data has been signaled to the processing circuit 64, e.g., the control circuit 640, the processing circuit 64 may receive the data from the memory 60a.

Figure 12:
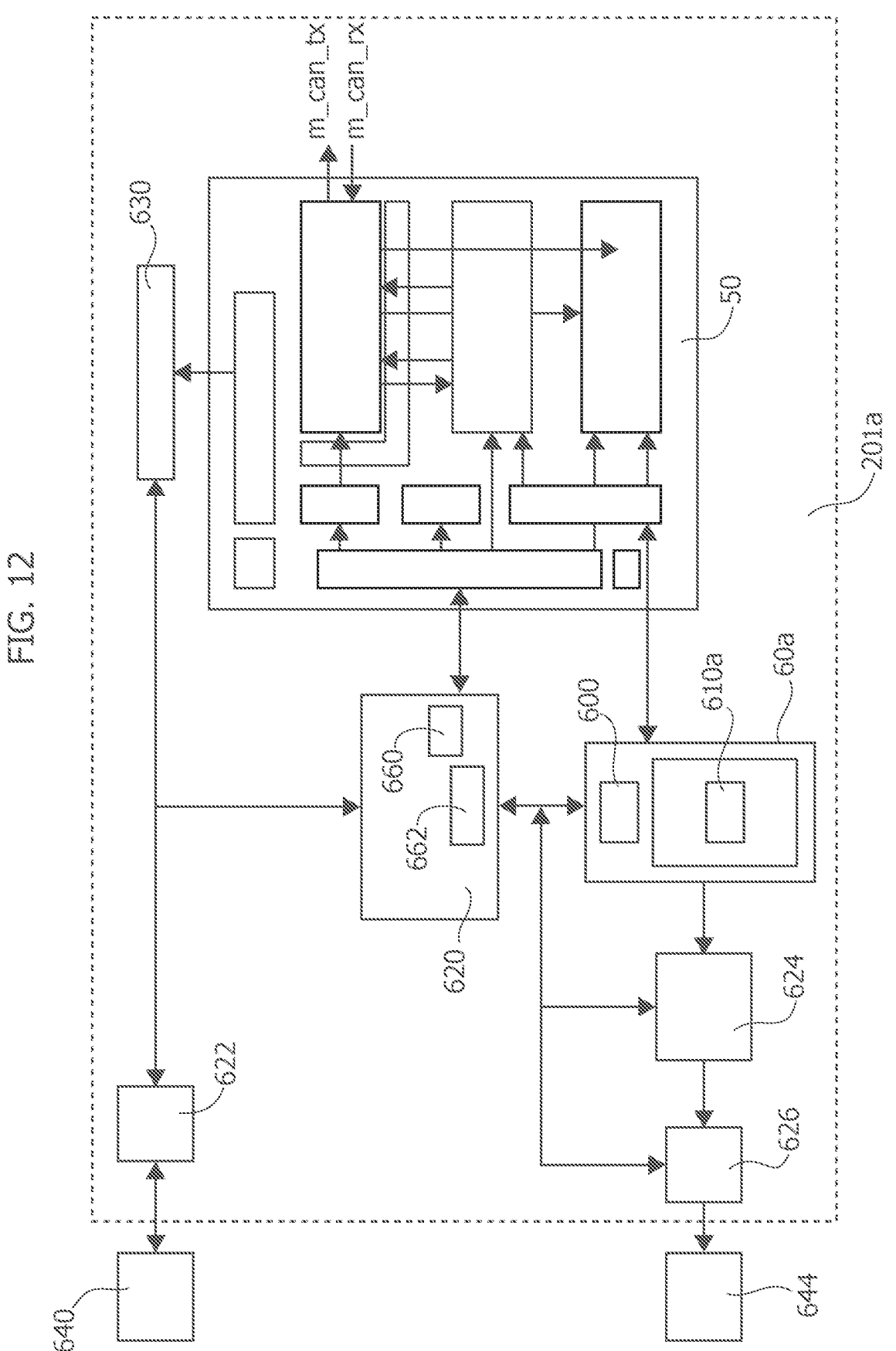

For example, as shown in FIG. 12, in various embodiments, during this phase, the processing circuit 64, e.g., the data interface circuit 624 does not access directly the memory 60a, but sends requests to the memory interface 624 or the CAN protocol management circuit 626. For example, the CAN protocol management circuit 626 may analyze the standard or extended identifier of the CAN message stored to the memory 60a, e.g., in order to identify point-to-point, multicast or broadcast communications, which may be signaled differently to the processing circuit 64. Additionally or alternatively, the circuit 626 may perform a conversion between the interfaces 644 and 624, and/or convert the data size (e.g., from 32 bit of the memory to 8 to 16 bit used by the interface 624).

Accordingly, as also schematically shown in FIG. 10, the hardware host 62a sends in a step 1110 a given data packet to the processing circuit 64, e.g., the data interface 624. In this respect, as mentioned before, when omitting the CAN protocol management circuit 626, this data packet comprises the original bits of the message stored to the Rx buffer element 610a of the Rx Buffers 610, wherein the data packet may correspond to the content of a memory location of the Rx buffer element 610a, a subset of the content of a memory slot (when the data interface has less than 32 bits) or the content of a plurality of memory slot (when the data interface has more than 32 bits). Conversely, when using a CAN protocol management circuit 626, the CAN protocol management circuit 626, may prefetch at least in part the content of the Rx buffer element 610a in the Rx Buffers 610 and transmit in the step 1110 only a subset of the respective bits to the processing circuit 64, for example only the bits of the data field of the CAN message, and optionally data identifying the standard or extended identifier included in the message.

Next, the hardware host 62a verifies in a step 1112 whether further data have to be transmitted to the processing circuit 64. Specifically, in case further data have to be transmitted (output "Y" of the verification step 1112), the hardware host 62a selects the next data and returns to the step 1110. Conversely, in case all data have been transmitted (output "Y" of the verification step 1112), the hardware host 62a proceeds to a step 1114.

Specifically, in the step 1114, the hardware host 62a acknowledges the read operation. For example, based on whether the received data have been stored to the Rx FIFO 0, the Rx FIFO 1 or a buffer element, the hardware host 62a may:

write the field "Rx FIFO 0 Acknowledge Index" (F0AI, bits 5 to 0) in the register "Rx FIFO 0 Acknowledge" (RXF0A, address 0x0A8), write the field "Rx FIFO 1 Acknowledge Index" (F1AI, bits 5 to 0) in the register "Rx FIFO 1 Acknowledge" (RXF1A, address 0x0B8), or reset the respective New Data flag in the register NDAT1 or NDAT2 associated with the respective Rx Buffer element.

For example, when using the first Rx buffer element 610a of the Rx Buffers 610, the control circuit 620 may reset the flag ND0 of the register NDAT1.

In various embodiments, the memory 60a may be configured to indicate whether the memory locations in the memory 60a contains valid data or not. In this case, the memory controller 600 manages for each memory location a respective status bit/flag indicating whether the associated memory location does not contain data (e.g., the flag is set to '0') or contains data (e.g., the flag is set to '1'). In this case, when receiving a write request, e.g., for storing data to a memory location associated with the Rx Buffer 610a, the memory controller 600 may be configured to assert the flag and write the received data to the respective memory location. Accordingly, in this case, the flags associated with the memory location of the Rx Buffer 610a written by the interface 510 are asserted. For example, in this way, the hardware host 62a may verify at the step 1112 whether further memory locations have stored data by reading the flags of the memory locations of the Rx Buffer 610a. Accordingly, in this case, the hardware host 62a may clear at the step 1014 the flags associated with the memory locations of the Rx Buffer 610a, e.g., by sending one or more clear requests to the memory controller 600.

Accordingly, once the hardware host 62a has acknowledged the read operation, the data reception operation terminates at a stop step 1116.

Figure 13:
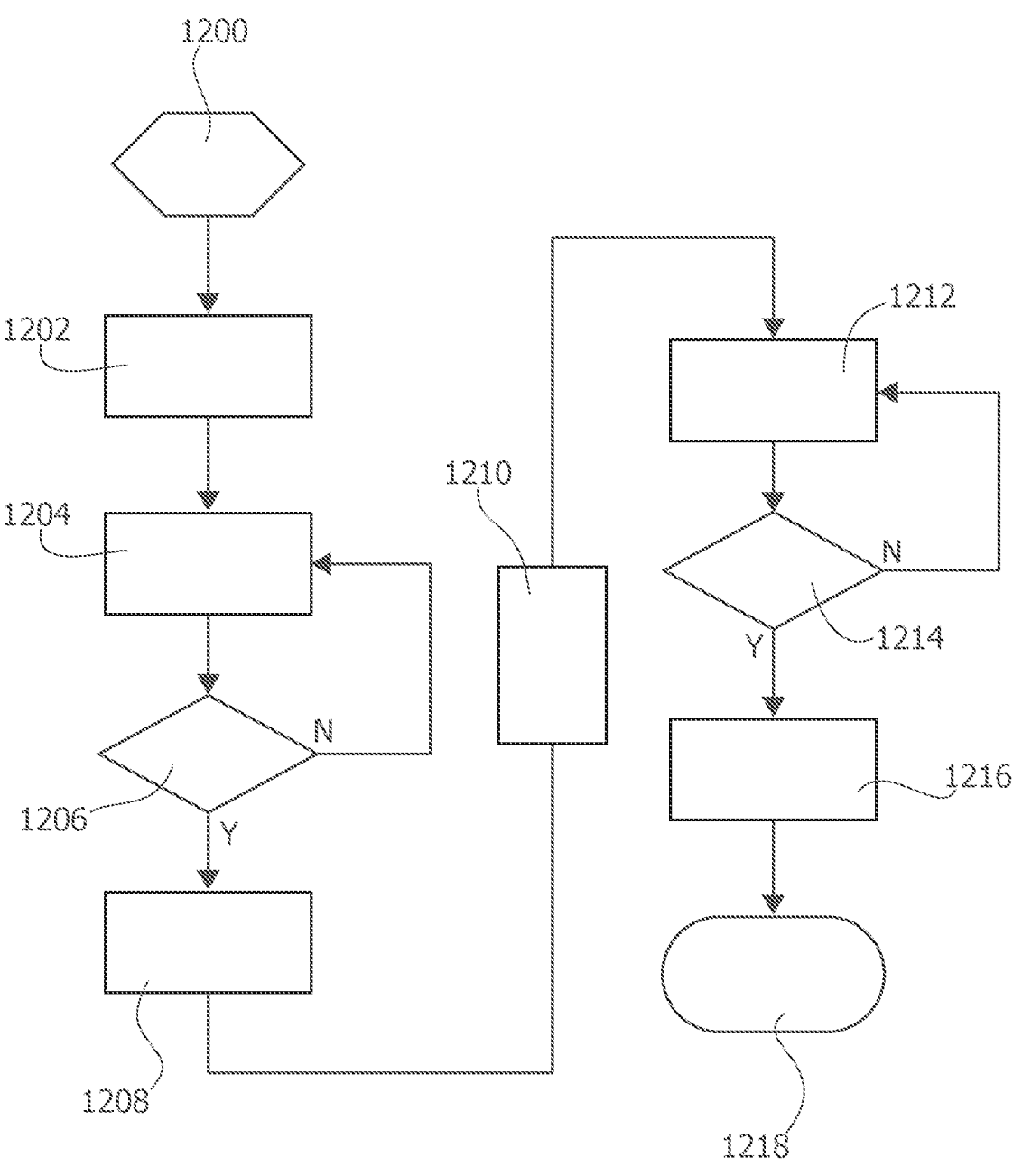
FIG. 13 shows an embodiment of the operation of a hardware host of FIG. 6 during a data transmission phase.

FIG. 13 shows an embodiment of the operation of data transmission management by the hardware host 62a.

As described with respect to FIG. 7, during the initialization/configuration phase, the hardware host 62a stores first configuration data CD1 and optionally predetermined configuration data to the registers 520. Accordingly, in order to correctly configure the M_CAN IP 50 for data transmission, theses configuration data comprises configuration data for configuring the Tx FIFO (memory area 612) and/or one or more buffer elements of the Tx Buffers (memory area 614) for data transmission.

Specifically, in case of a commander/responder type communication, the hardware host 62a may use a single Tx buffer element 614a of the Tx Buffers 614 for all data transmission operations, e.g., the first Tx buffer element. For example, when using a Tx buffer element 614a in the Tx Buffers 614, the hardware host 62a may omit the configuration of the Tx FIFO 612, and the first configuration data CD1 and/or or predetermined configuration data may comprise data for configuring the start address of the Tx Buffers 614 (via the field TXBC.TBSA) and the size of the elements of the Tx Buffer 614 by configuring the field TBDS of the register TXESC.

Accordingly, once having correctly configured via the initialization phase the configuration registers 520, the M_CAN IP 50 is ready to transmit data, such as a message stored to the Tx buffer element 614a of the Tx Buffers 614, as schematically shown via a step 1200.

Accordingly, in a step 1202, the hardware host 62a may receive a data transmission request from the processing circuit 64, e.g., via the control circuit 640.

Figure 14:
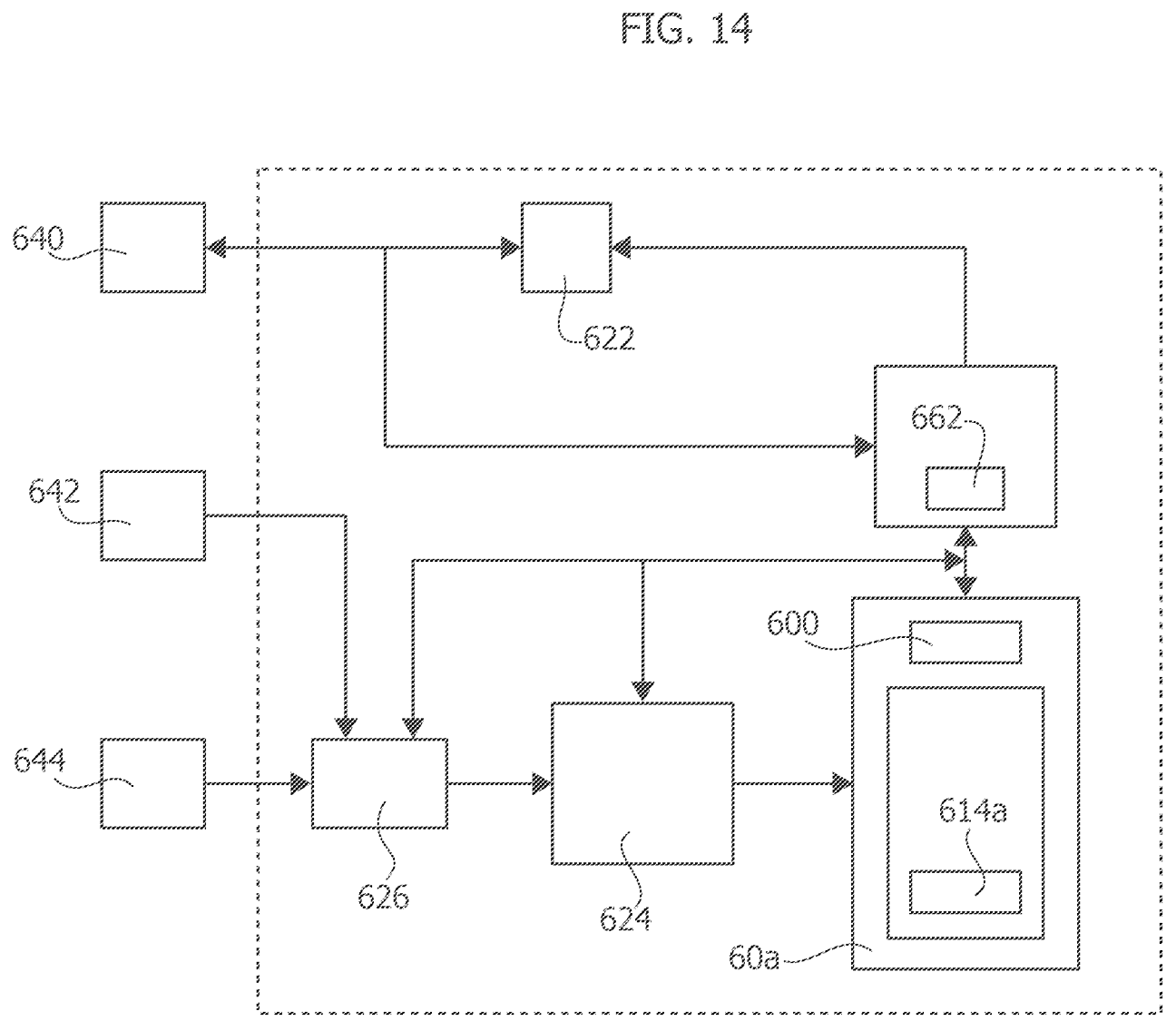

For example, as shown in FIG. 14, in various embodiments, the operation of writing data to the message RAM 60a is handled by the hardware host 62a, e.g., via the memory interface 624 and optionally the CAN protocol management circuit 626.

Accordingly, as shown in FIG. 13, the hardware host 62a may receive in a step 1204 a data packet from the processing circuit 64, e.g., the data interface circuit 644.

In this respect, as mentioned before, when omitting the CAN protocol management circuit 626, this data packet comprises the original bits of the message to be stored to the element 614a of the Tx Buffers 614, wherein the data packet may correspond to the content of a memory location of the Tx buffer element 614a, a subset of the content of a memory slot (when the data interface has less than 32 bits) or the content of a plurality of memory slot (when the data interface has more than 32 bits). Conversely, when using a CAN protocol management circuit 626, the CAN protocol management circuit 626 may receive data, e.g., corresponding to the data to be included in the data field of the CAN message, generate a CAN message and store the CAN message to the memory 60a, e.g., the element 614a of the Tx Buffers 614.

For example, in various embodiments, the control circuit 620 activates at the step 1202 a state TX_HEADER-_WRITE, where the CAN protocol management circuit 626 stores CAN header information into the Tx buffer element 614a of the Tx Buffers 614. For example, in order to correctly generate the CAN header information, the CAN protocol management circuit 626 may use one or more configuration data stored to the non-volatile memory, which e.g., may indicate the standard or extended ID to be included in the CAN header information. Accordingly, in this case, the control unit may proceed to the step 1204 by activating a state TX_PAYLOAD_WRITE. Accordingly, in this case, the CAN protocol management circuit 626 may receive via the steps 1204 sequentially the data to be included as payload in the CAN message, which is stored to the Tx buffer element 614a of the Tx Buffers 614.

For example, in various embodiments, the hardware host 62a may verify in a step 1206 whether the reception of data from the processing circuit 64 has ended. For example, the hardware host 62a may determine at the step 1202 whether a write request signal WREQ is asserted and at the step 1206 whether the write request signal WREQ is de-asserted again. Accordingly, in case the hardware host 62a determines that the reception of data from the processing circuit 64 has not ended (output "N" of the verification step 1206), the hardware host 62a returns to the step 1204 for receiving further data. Conversely, in case the hardware host 62a determines that the reception of data from the processing circuit 64 has ended (output "Y" of the verification step 1206), the hardware host 62a signals at a step 1208 that the M_CAN IP 50 should transmit the respective data.

For example, as mentioned before, in various embodiments, the Tx FIFO (memory are 612) may be omitted, and the hardware host 62a may store the data received from the processing circuit 64 to a Tx buffer element 614a of the Tx Buffers 614, such as the first Tx buffer element.

Figure 15:
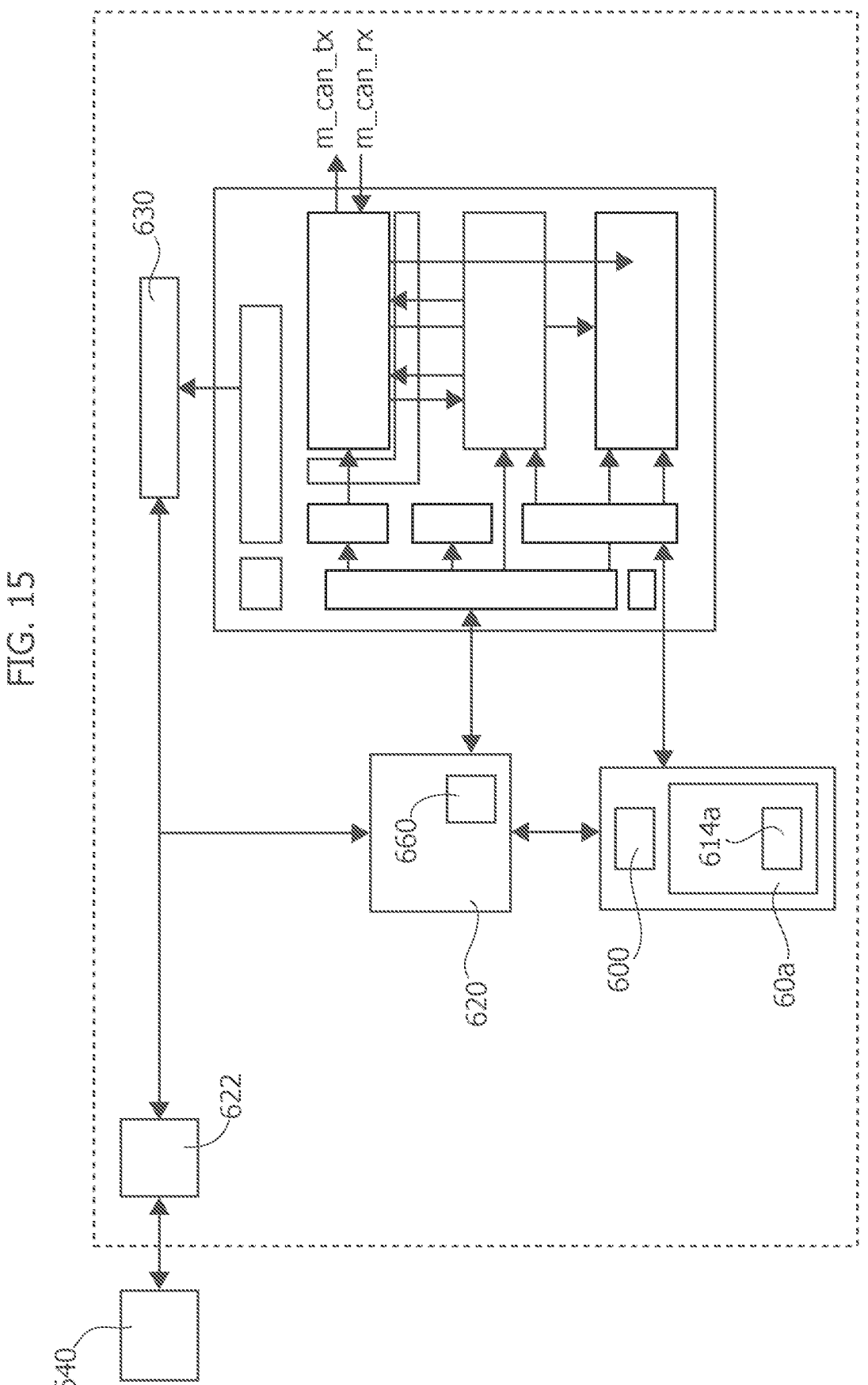

For example, as shown schematically in FIG. 15, when using a Tx buffer element 614a in the Tx Buffers 614, the control circuit 620 may start the data transmission in the step 1208 by setting the respective flag "Tx Buffer Add Request" (AR) in the register "Tx Buffer Add Request" (TXBAR, address 0x0D0), e.g., the flag AR0 (bit 0) for the first Tx buffer element 614a of the Tx Buffers 614.

Accordingly, in various embodiments, once the transmission of data has been requested, the M_CAN IP transmits in a step 1210 the data stored to the Tx buffer element 614a of the Tx Buffers 614 via the line m_can_tx. In this respect, the M_CAN IP manages autonomously the CAN arbitration and possible retransmission of data.

Accordingly, the hardware host 62a, e.g., the control circuit 620, may just determine at a step 1212 whether the data transmission has been completed. For example, for this purpose, an interrupt line may be configured to signal the completion of a data transmission operation and/or the hardware host 62a may monitor one or more status registers 520 of the M_CAN IP 50 via the slave interface 506.

For example, when using a Tx buffer element 614a of the Tx Buffers 614, the first configuration data CD1 and/or the predetermine configuration data (transmitted to the registers 520) may set the flag "Transmission Completed Interrupt Enable" (TCE, bit 9) of the register IE, enable at least one of the interrupt lines m_can_int0 and/or m_can_int1 via the flags EINT0 and EINT1 of the register ILE, and map the interrupt "Transmission Completed" to one of the enabled interrupt lines via the flag "Transmission Completed Interrupt Line" (TCL, bit 9) of the register ILS. For example, in this way, the M_CAN IP 50 may be configured to signal the storage of data to the Rx buffer element 610a via a first interrupt line and the completion of da data transmission from the Tx buffer element 614a via a second interrupt line.

Additionally or alternatively, the hardware host 62*a* may monitor the register "Tx Buffer Request Pending" (TXBRP, address 0x0CC) and/or the register "Tx Buffer Transmission Occurred" (TXBTO, address 0x0D8), e.g., the bit TO0 (bit 0) of the register TXBTO, when using the first Tx Buffer element 614*a* of the Tx Buffers 614.

Accordingly, as schematically shown via a verification step 1214, in case the data transmission has not been completed (output "N" of the verification step 1214), the hardware host 62*a* may return to the step 1212. Conversely, in case the data transmission has been completed (output "Y" of the verification step 1214), the hardware host 62*a* proceeds to a step 1216.

For example, in various embodiments, the hardware host 62*a* acknowledges in the step 1216 the transmission operation by resetting the flag associated with the respective Tx Buffer element in the register TXBTO, e.g., the flag TO0.

Moreover, in various embodiments, the hardware host 62*a* updates the memory status in the step 1216. Specifically, as described in the foregoing, the memory boa may be configured to manage memory locations in the memory in order to indicate whether the memory location contains valid data or not. In this case, the memory controller 600 manages for each memory location a respective status bit/flag indicating whether the associated memory location does not contain data (e.g., the flag is set to '0') or contains data (e.g., the flag is set to '1'). In this case, when receiving a write request for storing data to a memory location associated with the Tx Buffer 614*a*, the memory controller 600 asserts the respective flag and writes the received data to the respective memory location.

For example, in this way, the memory locations associated with the Tx Buffer 614*a* (and possibly also one or more of the other memory locations of the memory boa) may be configured as overwrite-protected memory locations. Specifically, in this case, when receiving a write request for storing data to an overwrite-protected memory location, the memory controller 600 may be configured to verify the logic value of the flag associated with the respective memory location and:

in response to determining that the flag is de-asserted (i.e., the memory location does not contain data), assert the flag and write the received data to the respective memory location; and in response to determining that the flag is asserted (i.e., the memory location contains data), inhibit the writing of data to the respective memory location.

Accordingly, in this case, the hardware host 62*a* may clear at the step 1216 the flags associated with the memory locations of the Tx Buffer 614*a*, e.g., by sending one or more clear requests to the memory controller 600.

Accordingly, once the hardware host 62*a* has updated the memory status, the transmission operation terminates at a stop step 1218.

Figure 16:
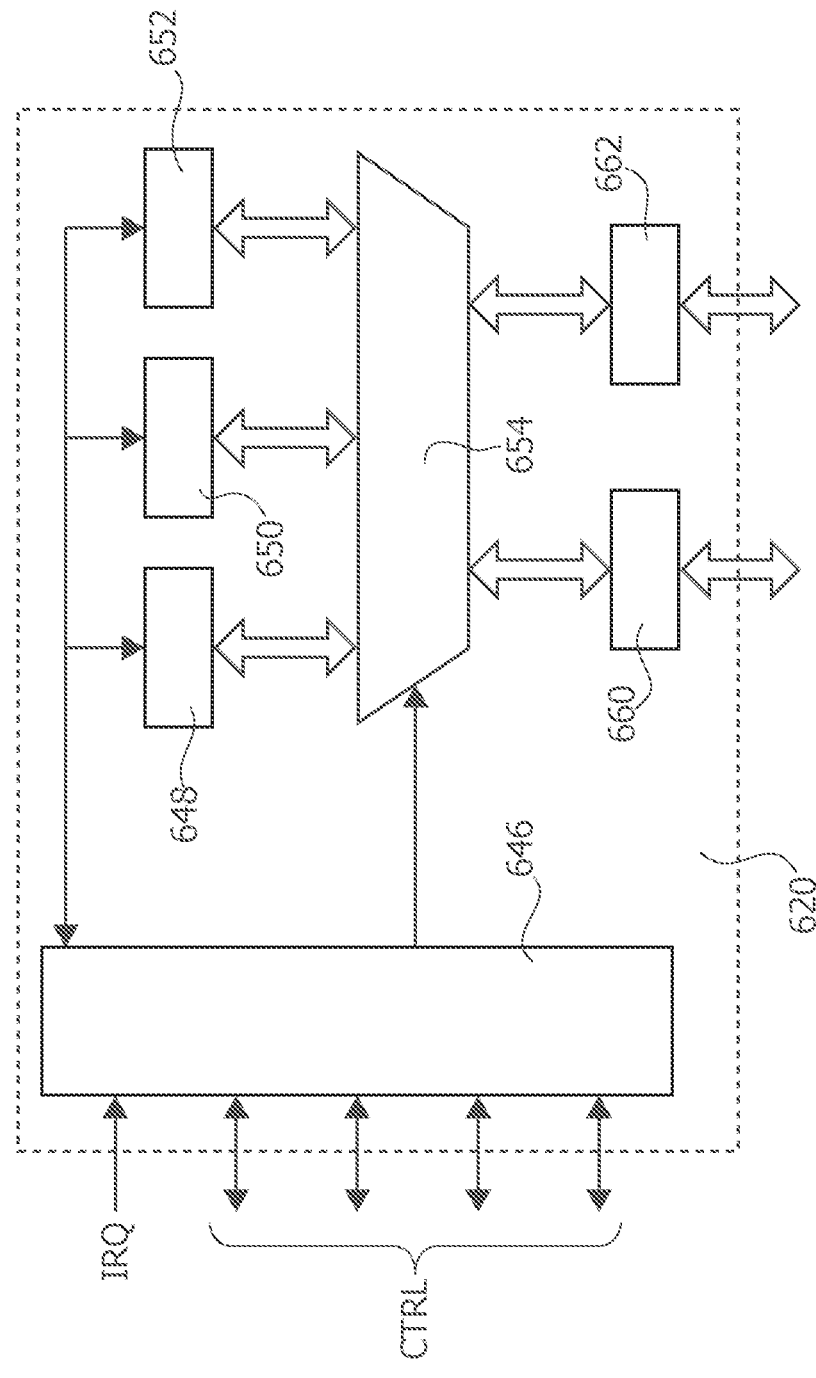
FIG. 16 shows an embodiment of a control circuit of the hardware host of FIG. 6.

FIG. 16 shows in this respect a possible embodiment of the control circuit 620.

Specifically, as described in the foregoing, in response to given events, the control circuit 620 is configured to manage an initialization mode/phase MCAN_INIT (FIG. 7), a reception mode/phase DATA_RX (FIG. 10) and a transmission mode/phase DATA_TX (FIG. 13).

For example, in the embodiment shown in FIG. 16, the transitions between these modes are managed by a mode control circuit 646, such as a sequential logic circuit implementing a first FSM. As mentioned before, in various embodiments, the initialization mode MCAN_INIT is started in response to given events, such as a wake-up, reset and/or initialization request received from the processing circuit 64, or given events signaled by the M_CAN IP 50. Accordingly, the initialization phase MCAN_INIT may be started immediately after a power-on of the control circuit 620, or the mode control circuit 646 may enter an idle state IDLE after power-on, and start the initialization mode MCAN_INIT in response to events signaled explicitly by the processing circuit 64 and/or the M_CAN IP 50. Thus, in general the control circuit 620 activates the initialization mode in response to one or more initialization request signals, such as a signal provided by a power supply monitoring circuit, a request signal received from the processing circuit and/or a failure signal provided by the M_CAN IP circuit 50.

For example, once the initialization mode MCAN_INIT is started, the mode control circuit 646 activates an initialization control circuit 648. Specifically, in the embodiment considered, the initialization control circuit 648 is configured to manages the phases INIT_REGISTERS, INIT_MEMORY and INIT_END for configuring the registers 520 and the message memory boa. Accordingly, the initialization control circuit 648 may be a sequential logic circuit implementing a second FSM.

Accordingly, in various embodiments, the initialization control circuit 648 may exchange control signals with the mode control circuit 646, in particular a first control signal generated by the mode control circuit 646 signaling the start of the initialization phase to the initialization control circuit 648 and a second control signal generated by the initialization control circuit 648 signaling the end of the initialization phase to the mode control circuit 646.

Accordingly, once the mode control circuit detects the end of the initialization mode MCAN_INIT, e.g., in response to the control signal generated by the initialization control circuit 648, the mode control circuit 646 activates the reception mode DATA_RX, which is signaled via a control signal to a reception control circuit 650. Specifically, in the embodiment considered, the reception control circuit is configured to detect the reception of data, e.g., via an interrupt signal generated by the M_CAN IP or by monitoring periodically one or more status registers 520. Moreover, once having detected the reception of data, the reception control circuit 650 is configured to manage the operation of the memory interface 624 and optionally the circuit 626 in order to read data from the buffer element 610*a* in the Rx Buffers 610, possibly also removing respective CAN header information, and transmit the read data to the processing circuit 64. Accordingly, the reception control circuit 650 may be a sequential logic circuit implementing a third FSM.

In general, once the processing circuit 64 has received data, the processing circuit 64 may respond or not. Accordingly, by default the mode control circuit 646 remains in the reception mode. Conversely, in case the processing circuit 64 requests the transmission of data, the mode control circuit 646 activates the transmission mode DATA_TX, which is signaled via a control signal to a transmission control circuit 652. Accordingly, in various embodiments, the step 1202 of FIG. 13, i.e., the operation of detecting whether the processing circuit 64 sends a data transmission request, is indeed performed during the reception mode, and the control circuit 646 activated the transmission mode in response to the signal indicating the data transmission request.

Specifically, in the embodiment considered, during a state TX_PAYLOAD_WRITE, the transmission control circuit 652 is configured to manage the operation of the memory interface 624 and optionally the circuit 626 in order to receive data from the processing circuit 64 and store the received data to the buffer element 614a in the Tx Buffers 614. In various embodiments, in response to detecting the activation of the transmission mode DATA_TX, the transmission control circuit 652 first manage a phase TX_HEADER_WRITE, wherein the circuit 626 stores via the memory interface circuit 624 CAN header information to the buffer element 614a, and then a phase TX_PAYLOAD_WRITE, wherein the circuit 626 stores via the memory interface circuit 624 the data received from the processing circuit 64 to the buffer element 614a.

Moreover, in various embodiments, the transmission control circuit 652 is configured to detect the completion of the data transmission, e.g., via an interrupt signal generated by the M_CAN IP or by monitoring periodically one or more status registers 520. Accordingly, once the transmission operation has been completed, the transmission control circuit 652 may signal the result to the mode control circuit 646, e.g., via a respective control signal signaling the end of the data transmission operation. In various embodiments, the transmission control circuit 652 may also detect whether the transmission has been cancelled. Accordingly, the transmission control circuit 652 may be a sequential logic circuit implementing a fourth FSM.

Accordingly, once the mode control circuit 646 detects the end of the data transmission operation, e.g., in response to the control signal generated by the transmission control circuit 652, the mode control circuit 646 activates again the reception mode DATA_RX.

Accordingly, in order to manage the transitions between the various phases and modes, the control circuits 646, 648, 650 and 652 may receive various control signals, such as one or more interrupt signals IRQ, e.g., the interrupt signals generated by the M_CAN IP 50, and one or more control signal CTRL, such as control signals received from the circuits 600, 624, 626, 632, 640 and/or 644.

In the embodiment considered, each of the various control circuits 648, 650 and 652 may control the operation of the master interface circuit 660 used to read and write the registers 520 of the M_CAN IP and the memory interface control circuit 662. Accordingly, in various embodiments, the circuits 660 and 662 are selectively connected to the initialization control circuit 648, the reception control circuit 650 or the transmission control circuit 652 based on whether the mode control circuit 646 has activated the initialization mode, the reception mode or the transmission mode, respectively. For example, in FIG. 16 is schematically shown a multiplexer 654 for this purpose.

Accordingly, the solutions disclosed herein provide a complete CAN communication and protocol controller circuit 201a for CAN/CAN-FD communication based on programmable M_CAN IP circuit. The hardware host 62a or the complete CAN communication and protocol controller circuit 201a may also be provided as a digital IP.

The hardware host 62a implements all the relevant operating modes needed to establish a Master-Slave communication between CAN nodes, without the need to equip the integrated device 20a with a CPU on board and related software development, thus reducing overall complexity and area occupation, allowing cost saving while increasing product competitive advantage. For example, for this purpose, the control circuit 620 may manage and supervise all the operations requested by the different operating modes identified (Initialization, Message Reception, Message Transmission), via dedicated FSMs, one for each functional mode, according to the expected behavior.

Of course, without prejudice to the principle of the invention, the details of construction and the embodiments may vary widely with respect to what has been described and illustrated herein purely by way of example, without thereby departing from the scope of the present invention, as defined by the ensuing claims.

According to one or more embodiments, the processing system having the advantageous features is specifically set forth in the claims that follow. Embodiments moreover concern a related integrated circuit, device and method. The claims are an integral part of the technical teaching of the disclosure provided herein.

What is claimed is:

1. A processing system comprises:

a processing circuit;

a volatile memory; and a Controller Area Network (CAN) communication controller circuit comprising configuration and status registers comprising:

a register CC Control Register (CCCR) comprising a bit Initialization (INIT) for starting and ending an initialization state of the CAN communication controller circuit and a bit Configuration Change Enable (CCE), for enabling write access to a subset of the configuration and status registers, a register Rx FIFO 0 Configuration (RXF0C) comprising a field Rx FIFO 0 Start Address (F0SA) for configuring a start address of a memory area in the volatile memory configured to store a first reception FIFO, a register Rx FIFO 1 Configuration (RXF1C) comprising a field Rx FIFO 1 Start Address (F1SA) for configuring a start address of a memory area in the volatile memory configured to store a second reception FIFO, a register Rx Buffer Configuration (RXBC) comprising a field Rx Buffer Start Address (RBSA) for configuring a start address of a memory area in the volatile memory configured to store at least one reception buffer element, a register Tx Event FIFO Configuration (TXEFC) comprising a field Event FIFO Start Address (EFSA) for configuring a start address of a memory area in the volatile memory configured to store a transmission FIFO, a register Tx Buffer Configuration (TXBC) comprising a field Tx Buffer Start Address (TBSA) for configuring a start address of a memory area in the volatile memory configured to store at least one transmission buffer element, a register Standard ID Filter Configuration (SIDFC) comprising a field Filter List Standard Start Address (FLSSA) for configuring a start address of a memory area in the volatile memory configured to store at least one standard filter element, wherein each standard filter element comprises a field Standard Filter Element Configuration (SFEC) to specify whether a standard CAN message should be stored to the first reception FIFO, the second reception FIFO or a reception buffer element and, in case the field SFEC indicates that a standard CAN message should be stored to a reception buffer element, a field Standard Filter ID 2 (SFID2) is used to select a reception buffer element and a field Standard Filter ID 1, SFID1, specifies a standard identifier for a standard CAN message to be stored to the selected reception buffer element, a register Extended ID Filter Configuration (XIDFC) comprising a field Filter List Extended Start Address (FLESA) for configuring a start address of a memory area in the volatile memory configured to store at least one extended filter element, wherein each extended filter element comprises a field Extended Filter Element Configuration (EFEC) used to specify whether an extended CAN message should be stored to the first reception FIFO, the second reception FIFO or a reception buffer element and, in case the field EFEC indicates that an extended CAN message should be stored to a reception buffer element, a field Extended Filter ID 2 (EFID2) is used to select a reception buffer element and a field Extended Filter ID 1 (EFID1) specifies an extended identifier for an extended CAN message to be stored to the selected reception buffer element, a register Tx Buffer Add Request (TXBAR) comprising for each transmission buffer element a respective bit Tx Buffer Add Request (AR) for requesting the transmission of a CAN message stored to the respective transmission buffer element, and a reception status register indicating that a CAN message has been received and a transmission status register indicating that a CAN message has been transmitted;

a slave communication interface operatively connected to the configuration and status registers and configured to receive read requests for reading a content of the configuration and status registers, and write requests for writing the content of the configuration and status registers;

a master communication interface connected to the slave communication interface of the CAN communication controller circuit;

a CAN core circuit configured to, when the bit INIT of the register CCCR indicates that the CAN communication controller circuit is not in the initialization state, transmit a CAN message via a transmission line and receive a CAN message via a reception line (m_can_rx); and a control circuit comprising a sequential logic circuit implementing a finite state machine configured to manage an initialization mode, a reception mode and a transmission mode.

2. The processing system according to claim 1, further comprising:

a transmission handler circuit configured to:

monitor the register TXBAR in order to determine whether a CAN message stored to a transmission buffer element in the volatile memory should be transmitted, in response to determining that the CAN message stored to the transmission buffer element should be transmitted, determine the address of the respective transmission buffer element based on the field TBSA of the register TXBC, read the CAN message stored to the respective transmission buffer element from the volatile memory and transmit the read CAN message via the CAN core circuit, and once the CAN message has been transmitted, assert a flag in the transmission status register in order to indicate that the CAN message has been transmitted; and a reception handler circuit configured to:

read at least one standard filter element and or extended filter from the volatile memory, wherein the respective memory areas are indicated by the field FLSSA of the register SIDFC and the field FLESA of the register XIDFC, receive via the CAN core circuit a CAN message, determine whether a standard or extended filter element applies to the received CAN message, in case a standard or extended filter element applies to the received CAN message, determine whether the received CAN message should be stored to the first reception FIFO, the second reception FIFO or a given reception buffer element as indicated by the respective standard or extended filter element, in response determining that the CAN message should be stored to a reception buffer element, determine the address of the given reception buffer element based on the field RBSA of the register RXBC, and store the received CAN message to the given reception buffer element in the volatile memory, and once the received CAN message has been stored to the given reception buffer element, assert a flag in the reception status register in order to indicate that a CAN message has been received and stored to the given reception buffer element.

3. The processing system according to claim 2, further comprising a hardware host circuit comprising:

a memory interface circuit configured to write data to and read data from the volatile memory; and a non-volatile memory configured to store first configuration data and second configuration data, wherein the first configuration data comprise configuration data to be transferred to the configuration and status registers of the CAN communication controller circuit and the second configuration data comprise at least one standard and/or extended filter element to be transferred to the volatile memory.

4. The processing system according to claim 3, wherein the control circuit is configured to start the initialization mode in response to an initialization request signal, wherein the control circuit is configured to in the initialization mode:

send a write request via the master communication interface in order to assert the bit CCE of the register CCCR, read the first configuration data from the non-volatile memory and send write requests via the master communication interface in order to store the first configuration data to the configuration and status registers, read the second configuration data from the non-volatile memory and store the second configuration data via the memory interface circuit to the volatile memory, and send a write request via the master communication interface in order to de-assert the bit INIT of the register CCCR.

5. The processing system according to claim 4, wherein the initialization request signal corresponds to a signal provided by a power supply monitoring circuit, a request signal received from the processing circuit or a failure signal provided by the CAN communication controller circuit.

6. The processing system according to claim 3, wherein the control circuit is configured to activate the reception mode, wherein the control circuit is configured to in the reception mode:

wait until the flag in the reception status register is asserted so as to indicate that a CAN message has been received, and in response to detecting that the flag in the reception status register is asserted:

signal the reception of the CAN message to the processing circuit, read via the memory interface circuit a payload from the received CAN message stored to the reception buffer element and send a read payload to the processing circuit, send a write request via the master communication interface in order to de-assert the flag in the reception status register, and monitor a data transmission request signal provided by the processing circuit in order to determine whether the processing circuit requests the transmission of data in response to the received CAN message and, in response to determining that the processing circuit requests the transmission of data.

7. The processing system according to claim 6, wherein the control circuit is configured to activate the transmission mode;

wherein the control circuit is configured to in the transmission mode:

receive a payload of a CAN message to be transmitted from the processing circuit and store via the memory interface circuit the received payload to the transmission buffer element, send a write request via the master communication interface in order to assert the bit AR associated with the transmission buffer element in the register TXBAR in order to indicate that a CAN message stored to the transmission buffer element should be transmitted, wait until the flag in the transmission status register is asserted to indicate that the CAN message has been transmitted, and in response to detecting that the flag in the transmission status register is asserted, send a write request via the master communication interface in order to de-assert the flag in the transmission status register, and activate the reception mode.

8. The processing system according to claim 7, wherein the configuration and status registers comprise:

a register Interrupt Register, IR, configured to store interrupt flags, wherein a first interrupt flag of the register IR is associated with the flag in the reception status register indicating that a CAN message has been received and a second interrupt flag of the register IR is associated with the flag in the transmission status register in order to indicate that the CAN message has been transmitted, and a register Interrupt Enable, IE, configured to store data used to enable or disable each of the interrupt flags of the register IR;

wherein the waiting until the flag in the reception status register is asserted comprises monitoring the first interrupt flag of the register IR, and wherein the waiting until the flag in the transmission status register is asserted, comprises monitoring the second interrupt flag of the register IR; and wherein the first configuration data comprise configuration data and/or the control circuit is configured to store predetermined configuration data to the configuration and status registers in order to:

program the register IE in order to enable the first interrupt flag associated with the flag in the reception status register indicating that a CAN message has been received and enable the second interrupt flag associated with the flag in the transmission status register in order to indicate that the CAN message has been transmitted.

9. The processing system according to claim 8, wherein the CAN communication controller circuit comprises a first interrupt line and a second interrupt line, and the configuration and status registers comprise:

a register Interrupt Line Select, ILS, configured to assign an interrupt generated by a given interrupt flag from the register IR to the first interrupt line or the second interrupt line; and a register Interrupt Line Enable (ILE) used to enable or disable each of the first interrupt line and the second interrupt line;

wherein the monitoring the first interrupt flag of the register IR comprises monitoring the first interrupt line; and wherein the first configuration data comprise configuration data and/or the control circuit is configured to store predetermined configuration data to the configuration and status registers in order to:

program the register ILS in order to assign the first interrupt flag to the first interrupt line, and program the register ILE in order to enable the first interrupt line.

10. The processing system according to claim 9, wherein the monitoring the second interrupt flag of the register IR comprises monitoring the second interrupt line; and wherein the first configuration data comprise configuration data and/or the control circuit is configured to store predetermined configuration data to the configuration and status registers in order to:

program the register ILS in order to assign the second interrupt flag to the second interrupt line, and program the register ILE in order to enable the second interrupt line.

11. The processing system according to claim 10, wherein the volatile memory comprises a memory area having a plurality of memory locations, a memory controller configured to manage read and write operations accessing the memory locations of the memory area, and a memory status register comprising a respective memory status flag for each of the memory locations, wherein the memory controller is configured to receive a write request for writing data to a given memory location of the volatile memory associated with the reception buffer element and, in response to receiving the write request:

write received data to the given memory location, and assert the memory status flag associated with the given memory location;

wherein the memory controller asserts the memory status flags associated with the memory locations of the reception buffer element to which the CAN communication controller circuit stores the received CAN message;

wherein the reading via the memory interface circuit a payload from the CAN message stored to the reception buffer element comprises reading a content of the memory locations associated with the reception buffer elements, which have asserted the respective memory status flag; and wherein the control circuit is configured to, in response to detecting that the flag in the reception status register is asserted and once have sent a read payload to the processing circuit, de-assert the memory status flags associated with the memory locations of the reception buffer element.

12. The processing system according to claim 11, wherein the memory controller is configured to receive a write request for writing data to a given memory location of the volatile memory associated with the transmission buffer element and, in response to receiving the write request, determine whether the memory status flag associated with the given memory location is asserted and:

in response to determining that the memory status flag associated with the given memory location is de-asserted, write the received data to the given memory location and assert the memory status flag associated with the given memory location, and in response to determining that the memory status flag associated with the given memory location is asserted, inhibit the writing of the received data to the given memory location;

wherein the memory controller asserts the memory status flags associated with the memory locations of the transmission buffer element to which the hardware host circuit stores the received payload; and wherein the control circuit is configured to, in response to detecting that the flag in the transmission status register is asserted, de-assert the memory status flags associated with the memory locations of the transmission buffer element.

13. The processing system according to claim 3, wherein the hardware host circuit comprise a CAN protocol management circuit;

wherein the CAN protocol management circuit is configured to read via the memory interface circuit a payload from the CAN message stored to the reception buffer element and send a read payload to the processing circuit by:

reading via the memory interface circuit the CAN message stored to the reception buffer element, extracting the payload from the CAN message and sending the extracted payload to the processing circuit; and wherein the CAN protocol management circuit is configured to receive a payload of a CAN message from the processing circuit and store via the memory interface circuit the received payload to the transmission buffer element by:

receiving the payload of a CAN message from the processing circuit, generating a CAN message by adding a CAN header to the received payload and storing via the memory interface circuit the generated CAN message to the transmission buffer element.

14. The processing system according to claim 3, wherein predetermined configuration data is stored to the configuration and status registers in order to:

program the register RXBC in order to configure the start address of the memory area in the volatile memory adapted to store at least one reception buffer element, and program the register TXBC in order to configure the start address of the memory area in the volatile memory adapted to store at least one transmission buffer element.

15. The processing system according to claim 14, wherein predetermined configuration data is stored to the configuration and status registers in order to:

program the register SIDFC in order to configure the start address of the memory area in the volatile memory adapted to store at least one standard filter element; and program the register XIDFC in order to configure the start address of the memory area in the volatile memory adapted to store at least one extended filter element.

16. The processing system according to claim 3, wherein the non-volatile memory comprises a plurality of memory slots for storing the first configuration data and the second configuration data, wherein each memory slot is univocally associated with a given configuration and status registers of the CAN communication controller circuit or a given memory location is the volatile memory; or wherein the first configuration data and the second configuration data are stored as data packets, wherein each data packet comprises the address of a respective configuration and status registers of the CAN communication controller circuit or a respective memory location is the volatile memory.

17. An integrated circuit comprising a processing system according to claim 3.

18. A device comprising a plurality of processing systems according to claim 3, wherein the processing systems are connected to a CAN bus.

19. A method of operating a processing system comprising:

storing a first configuration data and a second configuration data to a non-volatile memory;

switching on the processing system;

receiving a payload of a received CAN message from a hardware host circuit, and providing the payload of a CAN message to be transmitted to the hardware host circuit, wherein the processing system comprises:

a processing circuit;

a volatile memory; and a Controller Area Network (CAN) communication controller circuit comprising configuration and status registers comprising:

a register CC Control Register (CCCR) comprising a bit Initialization (INIT) for starting and ending an initialization state of the CAN communication controller circuit and a bit Configuration Change Enable (CCE), for enabling write access to a subset of the configuration and status registers, a register Rx FIFO 0 Configuration (RXF0C) comprising a field Rx FIFO 0 Start Address (F0SA) for configuring a start address of a memory area in the volatile memory configured to store a first reception FIFO, a register Rx FIFO 1 Configuration (RXF1C) comprising a field Rx FIFO 1 Start Address (F1SA) for configuring a start address of a memory area in the volatile memory configured to store a second reception FIFO, a register Rx Buffer Configuration (RXBC) comprising a field Rx Buffer Start Address (RBSA) for configuring a start address of a memory area in the volatile memory configured to store at least one reception buffer element, a register Tx Event FIFO Configuration (TXEFC) comprising a field Event FIFO Start Address (EFSA) for configuring a start address of a memory area in the volatile memory configured to store a transmission FIFO, a register Tx Buffer Configuration (TXBC) comprising a field Tx Buffer Start Address (TBSA) for configuring a start address of a memory area in the volatile memory configured to store at least one transmission buffer element, a register Standard ID Filter Configuration (SIDFC) comprising a field Filter List Standard Start Address (FLSSA) for configuring a start address of a memory area in the volatile memory configured to store at least one standard filter element, wherein each standard filter element comprises a field Standard Filter Element Configuration (SFEC) to specify whether a standard CAN message should be stored to the first reception FIFO, the second reception FIFO or a reception buffer element and, in case the field SFEC indicates that a standard CAN message should be stored to a reception buffer element, a field Standard Filter ID 2 (SFID2) is used to select a reception buffer element and a field Standard Filter ID 1, SFID1, specifies a standard identifier for a standard CAN message to be stored to the selected reception buffer element, a register Extended ID Filter Configuration (XIDFC) comprising a field Filter List Extended Start Address (FLESA) for configuring a start address of a memory area in the volatile memory configured to store at least one extended filter element, wherein each extended filter element comprises a field Extended Filter Element Configuration (EFEC) used to specify whether an extended CAN message should be stored to the first reception FIFO, the second reception FIFO or a reception buffer element and, in case the field EFEC indicates that an extended CAN message should be stored to a reception buffer element, a field Extended Filter ID 2 (EFID2) is used to select a reception buffer element and a field Extended Filter ID 1 (EFID1) specifies an extended identifier for an extended CAN message to be stored to the selected reception buffer element, a register Tx Buffer Add Request (TXBAR) comprising for each transmission buffer element a respective bit Tx Buffer Add Request (AR) for requesting the transmission of a CAN message stored to the respective transmission buffer element, and a reception status register indicating that a CAN message has been received and a transmission status register indicating that a CAN message has been transmitted;

a slave communication interface operatively connected to the configuration and status registers and configured to receive read requests for reading a content of the configuration and status registers, and write requests for writing the content of the configuration and status registers;

a CAN core circuit configured to, when the bit INIT of the register CCCR indicates that the CAN communication controller circuit is not in the initialization state, transmit a CAN message via a transmission line and receive a CAN message via a reception line; and a transmission handler circuit configured to:
  monitor the register TXBAR in order to determine whether a CAN message stored to a transmission buffer element in the volatile memory should be transmitted,
  in response to determining that a CAN message stored to a transmission buffer element should be transmitted, determine the address of the respective transmission buffer element based on the field TBSA of the register TXBC, read the CAN message stored to the respective transmission buffer element from the volatile memory and transmit the read CAN message via the CAN core circuit, and once the CAN message has been transmitted, assert a flag in the transmission status register in order to indicate that the CAN message has been transmitted.

20. The method according to claim 19, wherein the processing system further comprises a reception handler circuit configured to:
  read at least one standard filter element and or extended filter from the volatile memory, wherein the respective memory areas are indicated by the field FLSSA of the register SIDFC and the field FLESA of the register XIDFC,
  receive via the CAN core circuit a CAN message,
  determine whether a standard or extended filter element applies to the received CAN message,
  in case a standard or extended filter element applies to the received CAN message, determine whether the received CAN message should be stored to the first reception FIFO, the second reception FIFO or a given reception buffer element as indicated by the respective standard or extended filter element,
  in response determining that the CAN message should be stored to a reception buffer element, determine the address of the given reception buffer element based on the field RBSA of the register RXBC, and store the received CAN message to the given reception buffer element in the volatile memory, and
  once the received CAN message has been stored to the given reception buffer element, assert a flag in the reception status register in order to indicate that a CAN message has been received and stored to the given reception buffer element.

21. The method according to claim 20, wherein the processing system further comprises a hardware host circuit comprising:
  a memory interface circuit configured to write data to and read data from the volatile memory;
  a non-volatile memory configured to store first configuration data and second configuration data, wherein the first configuration data comprise configuration data to be transferred to the configuration and status registers of the CAN communication controller circuit and the second configuration data comprise at least one standard and/or extended filter element to be transferred to the volatile memory; and
  a master communication interface connected to the slave communication interface of the CAN communication controller circuit.

22. The method according to claim 21, wherein the processing system further comprises:
  a control circuit comprising a sequential logic circuit implementing a finite state machine configured to manage an initialization mode, a reception mode and a transmission mode, wherein the control circuit is configured to start the initialization mode in response to an initialization request signal, wherein the control circuit is configured to:
    in the initialization mode:
    send a write request via the master communication interface in order to assert the bit CCE of the register CCCR,
    read the first configuration data from the non-volatile memory and send write requests via the master communication interface in order to store the first configuration data to the configuration and status registers, read the second configuration data from the non-volatile memory and store the second configuration data via the memory interface circuit to the volatile memory, send a write request via the master communication interface in order to de-assert the bit INIT of the register CCCR, and activate the reception mode;

in the reception mode:

wait until the flag in the reception status register is asserted, thereby indicating that a CAN message has been received, in response to detecting that the flag in the reception status register is asserted:

signal the reception of the CAN message to the processing circuit, read via the memory interface circuit a payload from the received CAN message stored to the reception buffer element and send a read payload to the processing circuit;

send a write request via the master communication interface in order to de-assert the flag in the reception status register, monitor a data transmission request signal provided by the processing circuit in order to determine whether the processing circuit requests the transmission of data in response to the received CAN message and, in response to determining that the processing circuit requests the transmission of data, activate the transmission mode; and in the transmission mode:

receive a payload of a CAN message to be transmitted from the processing circuit and store via the memory interface circuit the received payload to the transmission buffer element, send a write request via the master communication interface in order to assert the bit AR associated with the transmission buffer element in the register TXBAR in order to indicate that a CAN message stored to the transmission buffer element should be transmitted, wait until the flag in the transmission status register is asserted, thereby indicating that the CAN message has been transmitted, and in response to detecting that the flag in the transmission status register is asserted, send a write request via the master communication interface in order to de-assert the flag in the transmission status register, and activate the reception mode.

23. A processing system comprising:

a processing circuit;

a volatile memory;

a Controller Area Network (CAN) communication controller circuit comprising configuration and status registers, the CAN communication controller circuit configured to perform CAN protocol operations including CAN message transmission and CAN message reception;

a hardware host circuit comprising a non-volatile memory configured to store first configuration data and second configuration data, wherein the first configuration data comprise configuration data to be transferred to the configuration and status registers of the CAN communication controller circuit and the second configuration data comprise at least one filter element comprising CAN message identifier matching criteria to be transferred to the volatile memory;

a transmission handler circuit and a reception handler circuit configured to transmit and receive CAN messages via a CAN core circuit by exchanging data with the volatile memory based on the configuration data stored to the configuration and status registers, and the filter elements stored to the volatile memory; and a control circuit configured to manage an initialization mode, a reception mode and a transmission mode, wherein during the initialization mode, the hardware host circuit stores the first configuration data to the configuration and status registers and the second configuration data to the volatile memory.

* * * * *